(12) United States Patent
Xiong et al.

(10) Patent No.: US 12,167,498 B2
(45) Date of Patent: Dec. 10, 2024

(54) ENTERPRISE REMOTE MANAGEMENT FOR CELLULAR SERVICES

(71) Applicant: Apple Inc., Cupertino, CA (US)

(72) Inventors: Can Xiong, San Jose, CA (US); Sherman X. Jin, Santa Clara, CA (US); Eric Zelenka, Bend, OR (US); Graham S. McLuhan, San Jose, CA (US); Li Li, Los Altos, CA (US); Rafael L Rivera-Barreto, Santa Clara, CA (US); Raj S. Chaugule, Santa Clara, CA (US); Rohan C. Malthankar, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/476,674

(22) Filed: Sep. 28, 2023

(65) Prior Publication Data

US 2024/0031795 A1 Jan. 25, 2024

Related U.S. Application Data

(63) Continuation of application No. 17/449,440, filed on Sep. 29, 2021, now Pat. No. 11,812,506.

(60) Provisional application No. 63/086,026, filed on Sep. 30, 2020.

(51) Int. Cl.
*H04W 8/18* (2009.01)
*H04W 4/50* (2018.01)
*H04W 8/20* (2009.01)
*H04W 12/30* (2021.01)

(52) U.S. Cl.
CPC ............. *H04W 8/205* (2013.01); *H04W 4/50* (2018.02); *H04W 8/183* (2013.01); *H04W 12/30* (2021.01)

(58) Field of Classification Search
None
See application file for complete search history.

(56) References Cited

U.S. PATENT DOCUMENTS

| | | | |
|---|---|---|---|
| 10,356,614 B2 * | 7/2019 | Li | H04W 12/069 |
| 10,362,475 B2 * | 7/2019 | Namiranian | H04W 4/70 |
| 10,419,220 B2 * | 9/2019 | Takemori | H04L 9/0891 |
| 10,498,531 B2 * | 12/2019 | Yang | H04L 9/3273 |

(Continued)

Primary Examiner — Tuan A Tran
(74) Attorney, Agent, or Firm — DICKINSON WRIGHT RLLP

(57) ABSTRACT

This Application describes mechanisms for enterprise remote management of cellular services provided via access credentials, e.g., subscriber identity modules (SIMs) and/or electronic SIMs (eSIMs), for wireless devices. To minimize requirements for user interaction, installation and management of business-supplied cellular service profiles on the wireless device can intercept alert notifications to reduce interruptions and allow for background management of the business-supplied cellular service profiles. Additionally, a business enterprise can use multiple, distinct services to initiate installation of an eSIM to a wireless device. When two different services attempt to install eSIMs on the wireless device in parallel, management software on the wireless device can control an order of installation and disallow duplicate installations of an identical eSIM to the wireless device. The management software can also monitor eSIM installations and manage alert notifications that occur during the eSIM installation process.

20 Claims, 32 Drawing Sheets

(56) References Cited

U.S. PATENT DOCUMENTS

| | | | | |
|---|---|---|---|---|
| 10,615,990 | B2* | 4/2020 | Yang | H04W 12/35 |
| 10,791,459 | B1* | 9/2020 | Hu | H04W 8/245 |
| 11,089,480 | B2* | 8/2021 | Yang | H04W 12/06 |
| 11,102,017 | B2* | 8/2021 | Yang | H04W 4/70 |
| 11,172,350 | B1* | 11/2021 | Chaugule | H04M 17/10 |
| 11,223,941 | B2* | 1/2022 | Namiranian | H04W 4/70 |
| 11,422,786 | B2* | 8/2022 | Koo | G06F 8/61 |
| 11,503,457 | B2* | 11/2022 | Chaugule | H04M 17/10 |
| 11,533,160 | B2* | 12/2022 | Yang | H04W 12/42 |
| 11,736,931 | B2* | 8/2023 | Chaugule | H04W 8/205 |
| | | | | 455/411 |
| 2022/0104005 | A1 | 3/2022 | Xiong et al. | |

* cited by examiner

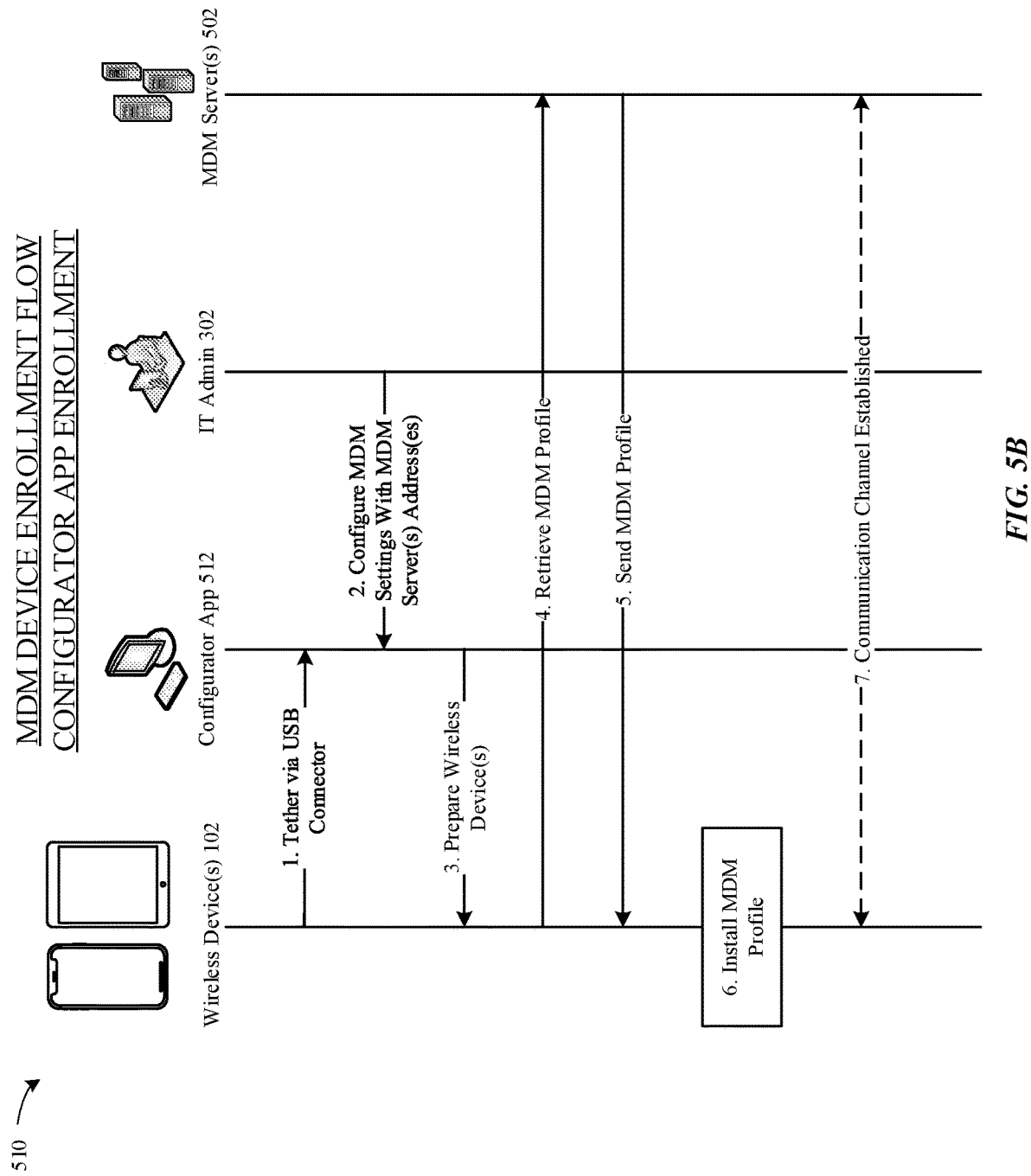

MOBILE DEVICE MANAGEMENT (MDM) ESIM PROVISIONING
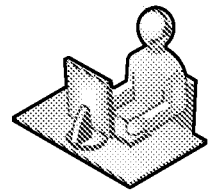
IT Admin 302
↓ Send MDM Commands
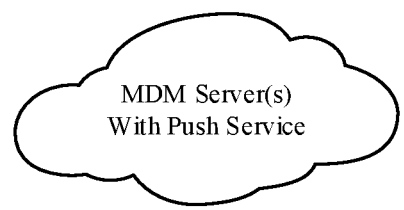
MDM Server(s) With Push Service
↓ Push MDM Commands
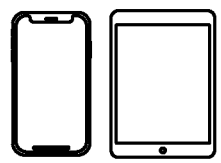
Wireless Device(s) 102
*FIG. 5D*

800 

MOBILE DEVICE MANAGEMENT eSIM COMMANDS

| Command | Resulting Actions |
|---|---|
| Refresh Cellular Plan | Send SMDP+ URL To Device And Trigger eSIM Installation |
| Prohibit New eSIM Addition | Disable "Add Cellular Plan" Button In Settings |
| Prohibit eSIM Deletion | Disable "Remove Cellular Plan" Button In Settings |
| Delete Cellular Plans | Use Erase Device Command With Preserve Data Plan Option From MDM |
| Limit Application Data Usage | Prevent Cellular Data From Being Used By Internal Applications |
| Disable Physical SIM Slot | Physical SIM Card Cannot Be Use On Enterprise Owned Device. Limit Enterprise Assigned eSIM To Business Usage Only |
| eSIM Selection | Select Enterprise eSIM; Disallow Selection Of Personal eSIM; Restrict Cellular Usage To Enterprise Assigned eSIM |
| Set Data Usage Quota | All X Gbyte Data Usage Per Month On Enterprise Assigned eSIM |
| Control Roaming Data Usage | Allow Or Disallow Cellular Data Via Enterprise Assigned eSIM When Roaming |
| Limit Cellular Plan Usage | Limit Cellular Plan To Only i) Voice Calls Or ii) Data Usage |

*FIG. 8*

ENTERPRISE REMOTE MANAGEMENT FOR CELLULAR SERVICES

CROSS-REFERENCE TO RELATED APPLICATIONS

The present application is a continuation of U.S. patent application Ser. No. 17/449,440, entitled "ENTERPRISE REMOTE MANAGEMENT FOR CELLULAR SERVICES", filed Sep. 29, 2021, which claims the benefit of U.S. Provisional Application No. 63/086,026, entitled "ENTERPRISE REMOTE MANAGEMENT FOR CELLULAR SERVICES," filed Sep. 30, 2020, the contents of both of which are incorporated by reference herein in their entireties for all purposes.

FIELD

The described embodiments set forth techniques for enterprise remote management of cellular services provided via access credentials, e.g., subscriber identity modules (SIMs) and/or electronic/embedded SIMs (eSIMs), for wireless devices.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic/embedded SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include, or alternatively supplement the use of, UICC-receiving bays in wireless devices. Wireless devices can support multiple access credentials simultaneously that support access to different wireless services based on one or more SIMs and/or eSIMs. The SIMs and/or eSIMs can provide for a combination of personal cellular plans/profiles and business enterprise managed cellular plans/profiles. Present models for business enterprise management of cellular service plans/profiles on a wireless device can require manual involvement of a user of the wireless device and/or of an information technology (IT) professions of the business enterprise.

BRIEF DESCRIPTION OF THE DRAWINGS

The disclosure will be readily understood by the following detailed description in conjunction with the accompanying drawings, wherein like reference numerals designate like structural elements.

FIG. 5B illustrates a flowchart of an example of MDM enrollment for a wireless device using a configurator application, according to some embodiments.

FIG. 5D illustrates a diagram of an example of MDM eSIM provisioning for a wireless device, according to some embodiments.

FIG. 8 illustrates an exemplary table of MDM commands for managing eSIMs on a wireless device, according to some embodiments.

SUMMARY

Figure 1:
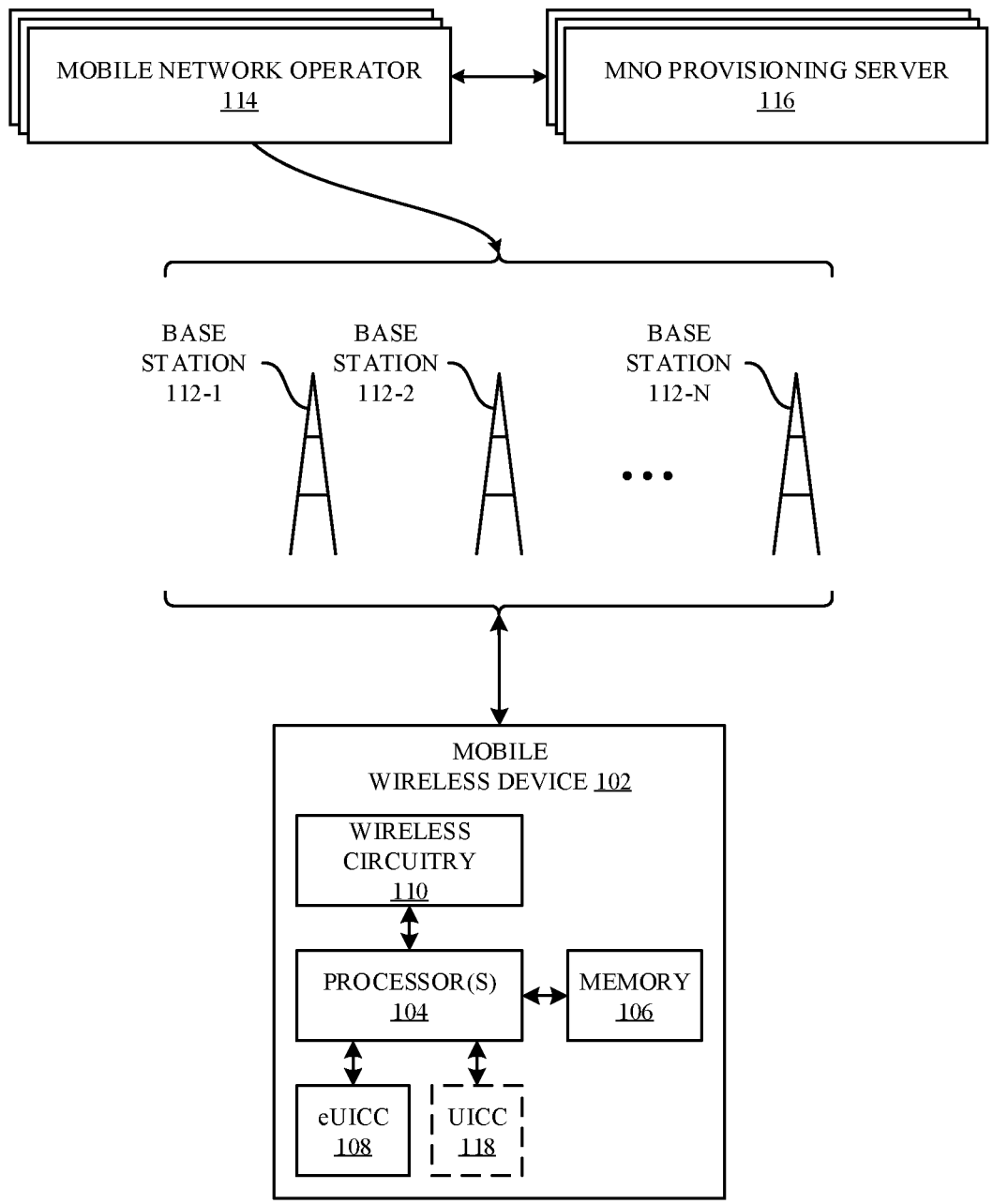
FIG. 1 illustrates a block diagram of different components of an exemplary system configured to implement the various techniques described herein, according to some embodiments.

This Application describes mechanisms to manage cellular service profiles, e.g., one or more subscriber identity modules (SIMs) and electronic/embedded SIMs (eSIMs), for wireless devices associated with a business enterprise. Management of the eSIMs can include control of addition, deletion, and modification of eSIMs on a wireless device and control of cellular wireless service features available for use on the wireless device for one or more of the eSIMs on the wireless device. A business enterprise can purchase wireless devices in bulk and ship individual wireless devices to users of the wireless devices associated with the business enterprise. With automated provisioning of eSIMs to the wireless devices, a business enterprise IT administrator can add one or more eSIMs to a wireless device using one or more network-based servers with minimal (or no) manual interaction required by the user of the wireless device. Additionally, the business enterprise IT administrator can install company-approved applications to the wireless device and configure various settings for the company-approved applications (as well as other resident applications) on the wireless device. The business enterprise IT administrator can manage cellular services available via the wireless device as well as other communication service and device settings to enforce compliance with company policies and secure access to company proprietary information. A wireless device can include multiple cellular service profiles in parallel, including a mixture of personal cellular service profiles and business-supplied cellular service profiles. A user of the wireless device can locally configure use of various personal cellular service profiles, while a business enterprise IT administrator can remotely configure use of various business-supplied cellular service profiles. To minimize requirements for user interaction, installation and management of business-supplied cellular service profiles on the wireless device can intercept alert notifications to reduce interruptions and allow for background management of the business-supplied cellular service profiles. Additionally, a business enterprise can use multiple, distinct services to initiate installation of an eSIM to a wireless device. When two different services attempt to install eSIMs on the wireless device in parallel, management software on the wireless device can control an order of installation and disallow duplicate installations of an identical eSIM to the wireless device. The management software can also monitor eSIM installations and manage alert notifications that occur during the eSIM installation process.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for management of cellular service profiles, e.g., subscriber identity modules (SIMs) and electronic/embedded SIMs (eSIMs), for wireless devices associated with a business enterprise. Wireless devices that support multiple profiles, e.g., i) dual SIMs, ii) a single SIM with one or more eSIMs on an eUICC, and iii) multiple eSIMs on an eUICC (with no physical SIMs installed) are becoming more prevalent. Present models for management of cellular service profiles on a wireless device associated with a business enterprise can require manual intervention by a user of the wireless device and/or by an information technology (IT) administrator of the business enterprise. As described further herein, automated management of cellular service profiles by a business enterprise using one or more network-based servers can minimize required interactions with a user and control use of cellular service profiles to align with company policies to improve security and ensure privacy. Business enterprise management of cellular service profiles can include i) bulk onboarding of wireless devices, ii) automated cellular service profile provisioning, iii) non-intrusive installation and management of company-approved applications, iv) control of settings for the wireless device and applications installed thereon, v) enforcement of company policies regarding security and privacy, and vi) remote management of wireless devices, including in some instances, tracking location of wireless devices and deletion of cellular service profiles and data from a wireless device. Automated cellular service profile management can include installation of a mobile device management (MDM) profile that enables a communication channel between the wireless device and a network-based server managed by a business enterprise associated with the wireless device. Using the network-based server, IT administrators can install, delete, modify, and otherwise control one or more cellular service profiles and/or one or more applications on the wireless device. Software on the wireless device can also manage notification alerts to minimize required interactions with a user of the wireless device when changes to cellular service profiles and/or applications on the wireless device occur. User consent notification alerts and configuration alerts for installation (and subsequent configuration) of a cellular service profile to the wireless device can be minimized to allow the user to defer providing responses to installation of the cellular service profile and subsequent configurations required thereof until at time convenient to the user of the wireless device. A wireless device can include multiple cellular service profiles in parallel, including a mixture of personal cellular service profiles and business-supplied cellular service profiles. A user of the wireless device can locally configure use of various personal cellular service profiles, while a business enterprise IT administrator can remotely assign various business-supplied cellular service profiles to the wireless device, including while a business-supplied cellular service profile is in use. To minimize requirements for user interaction, installation and management of business-supplied cellular service profiles on the wireless device can intercept alert notifications to reduce interruptions and allow for background management of the business-supplied cellular service profiles. Additionally, a business enterprise can use multiple, distinct services to initiate installation of an eSIM to a wireless device. When two different services attempt to install eSIMs on the wireless device in parallel, management software on the wireless device can control an order of installation and disallow duplicate installations of an identical eSIM to the wireless device. The management software can also monitor eSIM installations and manage alert notifications that occur during the eSIM installation process.

These and other embodiments are discussed below with reference to FIGS. 1-20; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®) or a cellular-capable wearable device (e.g., an Apple Watch), the base stations 112-1 to 112-*n* can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO 114, an eSIM is reserved for subsequent download and installation to the eUICC 108. In some embodiments, the eUICC 108 obtains one or more eSIMs from one or more associated provisioning servers 116. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
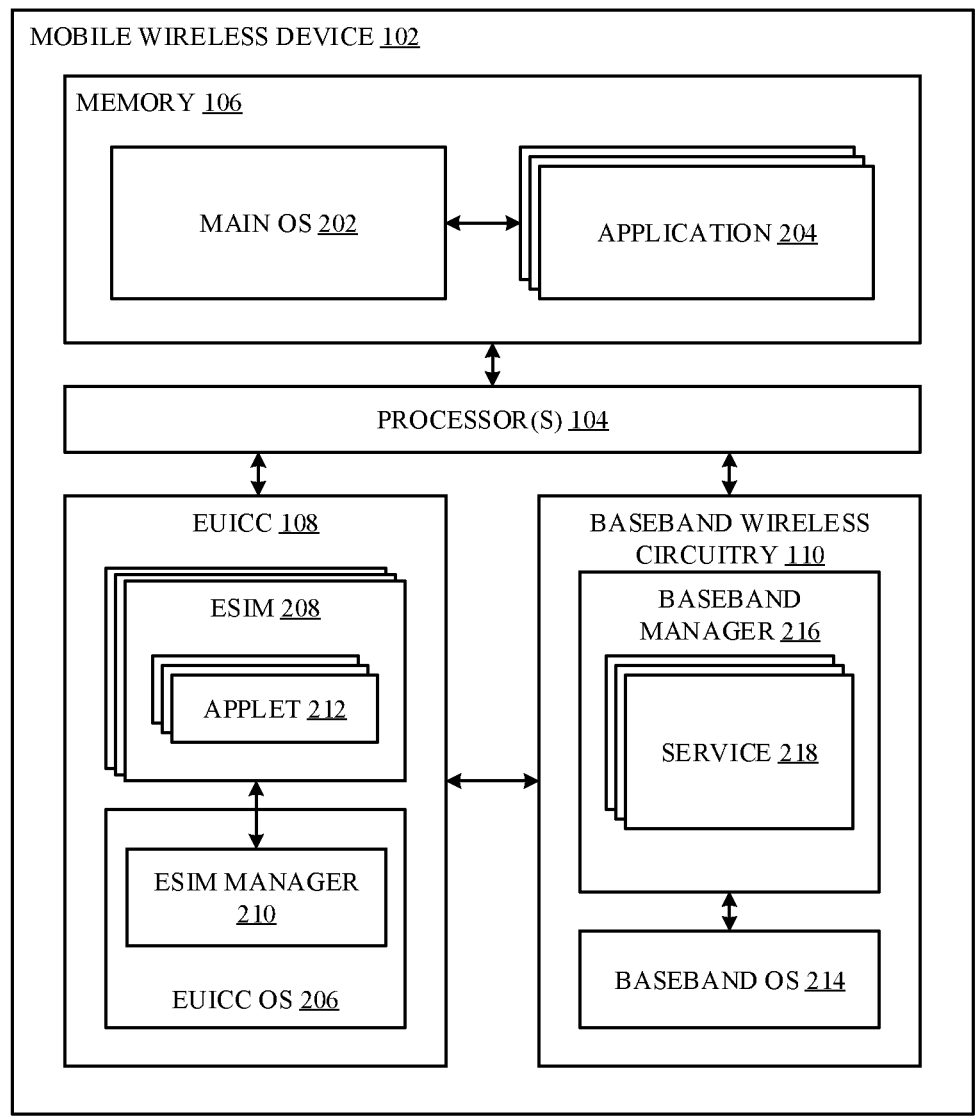
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
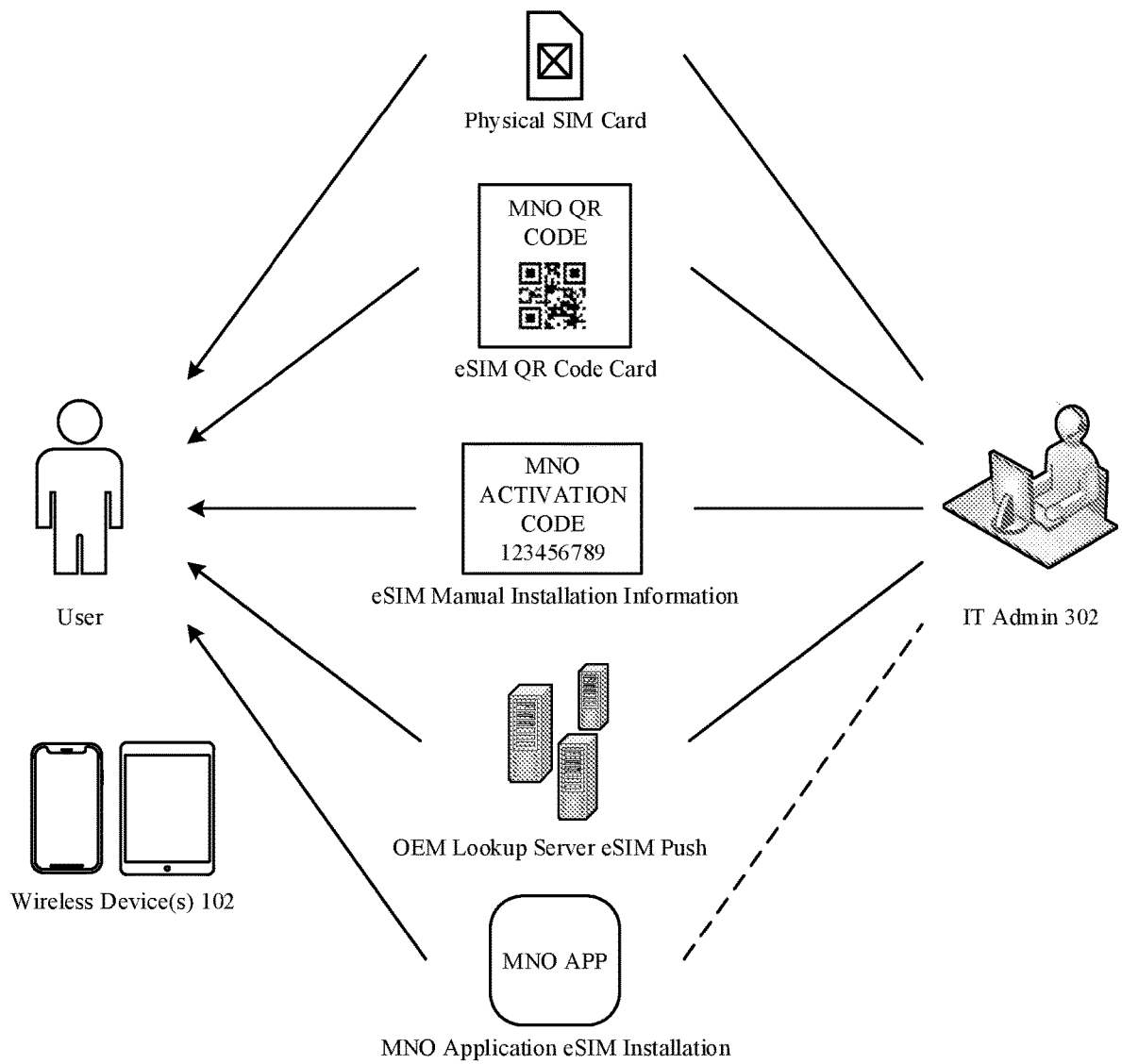
FIG. 3 illustrates examples of cellular service profile management by a business enterprise with manual provisioning to wireless devices, according to some embodiments.

FIG. 3 illustrates a diagram 300 of examples of manual provisioning of cellular service profiles, e.g., SIMs and/or eSIMs, to wireless devices 102 associated with a user. The user is also affiliated with a business enterprise that seeks to manage one or more cellular service profiles on one or more wireless devices 102 of the user. In a first example, an IT administrator 302 of the business enterprise can ship to the user a SIM card, e.g., a physical UICC 118 that includes installed thereon a SIM application, for installation in a wireless device 102. In a second example, the user can manually scan a quick response (QR) code provided by the IT administrator 302 to install an eSIM 208 non the wireless device 102. In a third example, the IT administrator 302 can provide detailed installation information from an MNO 114, e.g., an activation code, a network address for an MNO provisioning server 116, and a confirmation code, for the user to enter manually in order to install an eSIM 208 on the wireless device 102. In a fourth example, the IT administrator 302 can preconfigure availability of an eSIM 208 via a network-based server managed by the business enterprise for the user of the wireless device 102 and subsequently prompt the user to manually download and install the pre-configured eSIM 208 to the wireless device 102 based on interaction with the network-based server. In a fifth example, the IT administrator 302 can require the user to user an MNO-provided application to download and install an eSIM 208 from an MNO provisioning server 116. In each of these existing methods, manual intervention by the user of the mobile wireless device 102 and by an IT administrator 302 of the business enterprise can be required to install and manage the eSIM 208 onto the wireless device 102. As management of cellular service profiles, e.g., eSIMs 208, for multiple users (e.g., employees of the business enterprise) can require substantial time and effort, mechanisms to substantially automate downloading, installation, and subsequent control of cellular service profiles and other wireless device features (e.g., applications and settings) are proposed herein.

Business enterprises can also seek to maintain security and privacy of access to business enterprise information and services via wireless devices 102 that include business-supplied cellular service profiles installed thereon. Physical SIM cards, e.g., UICCs 118, can be disallowed for business use as a physical SIM card can be stolen and put business enterprise assets at risk. Security is improved with the use of eSIMs 208 on business-supplied (and/or business-managed) wireless devices 102; however, control of use of the eSIMs 208 can also be sought. In some instances, a business enterprise can require that personal cellular service profiles be disallowed on a company-owned wireless device 102. In some instances, a business enterprise can require that company-paid eSIMs 208 be used only for business purposes and not used for personal applications. In some instances, a business enterprise can disable a user's ability to modify and/or delete a company-assigned eSIM 208 on the wireless device 102. In some instances, a business enterprise can seek to control cellular service expenses, such as data overages and roaming charges. In some instances, a business enterprise can install tools on the wireless device 102 to manage use of cellular service profiles, e.g., one or more eSIMs 208, on the wireless device 102. In some instances, a business enterprise can remotely manage use of eSIMs 208 on the wireless device 102, via the company-managed network-based server.

Figure 4:
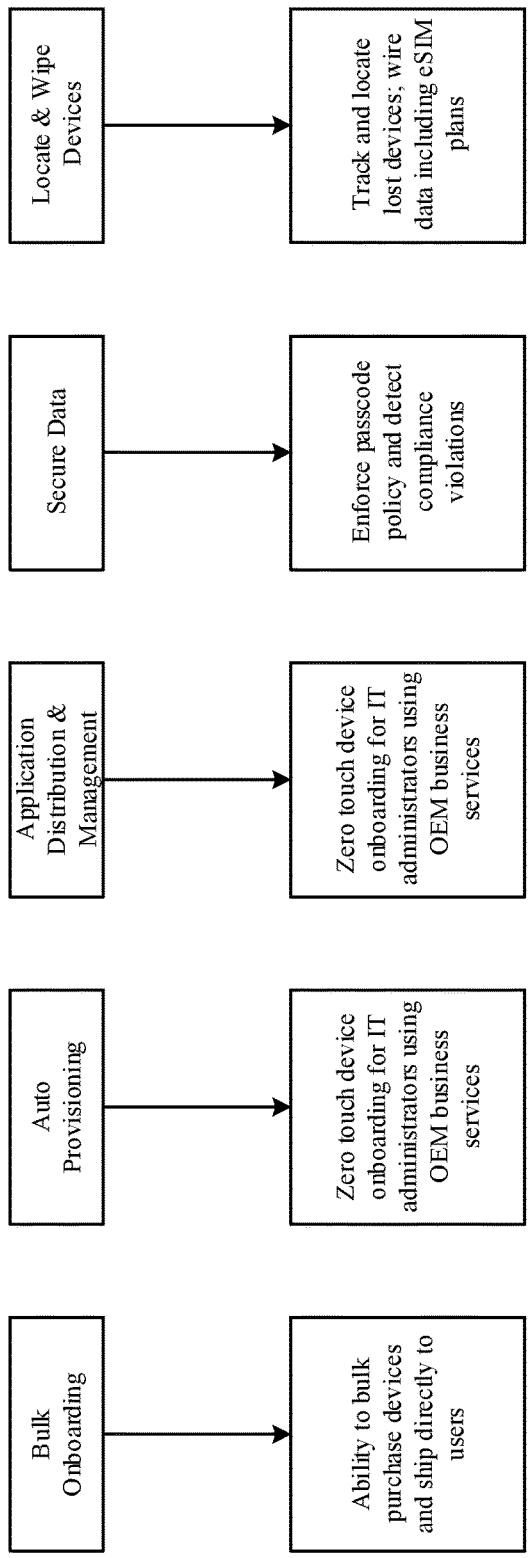
FIG. 4 illustrates exemplary features for enterprise device management of cellular services, according to some embodiments.

FIG. 4 illustrates a diagram 400 summarizing exemplary features for enterprise management of cellular wireless services for a wireless device 102. A business enterprise can purchase wireless devices 102 in bulk and ship individual wireless devices 102 to users associated with the business enterprise, e.g., employees and contractors. With automated provisioning of eSIMs 208 to the wireless devices 102, a business enterprise IT administrator can add one or more eSIMs 208 to a wireless device 102 using one or more network-based servers with minimal (or no) manual interaction required by the user of the wireless device 102. Additionally, the business enterprise IT administrator can install company-approved applications to the wireless device 102 and configure various settings for the company-approved applications (as well as other resident applications and system software) on the wireless device 102. The business enterprise IT administrator can manage cellular services available via the wireless device 102 as well as other communication service and device settings to enforce compliance with company policies and secure access to company proprietary information. A business enterprise IT administrator can also remotely manage a wireless device 102 and, in some instances, track a location of the wireless device 102 and delete information from the wireless device 102. In some instances, the business enterprise IT administrator can cause one or more eSIMs 208 to be removed from the wireless device 102. In some instances, the business enterprise IT administrator can wipe data from the wireless device 102. In some instances, the business enterprise IT administrator has an option to delete one or more eSIMs 208 from the wireless device 102 when deleting information from the wireless device 102.

Figure 5A:
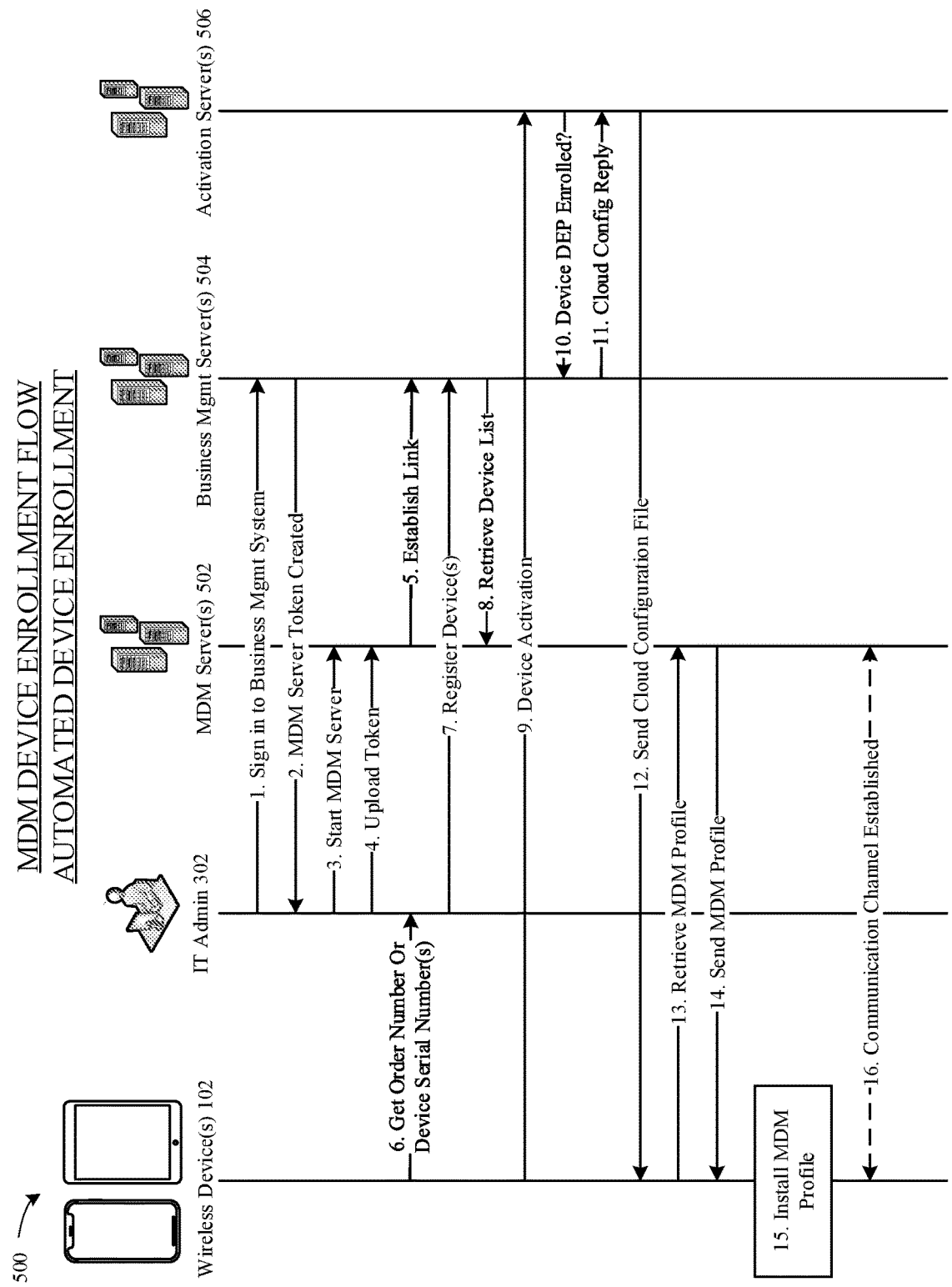
FIG. 5A illustrates a flowchart of an example of mobile device management (MDM) enrollment for a wireless device with automated device enrollment, according to some embodiments.

FIG. 5A illustrates a flowchart 500 of an example of mobile device management (MDM) enrollment for a wireless device 102 with automated device enrollment. A user can provide (or be provided) one or more wireless devices 102. An IT administrator 302 can sign into a business management system that uses a business management server 504. A mobile device management (MDM) token can be created, obtained, and/or retrieved by the business management server 504 and provided to the IT administrator 302. The business management server 504 can be managed by an original equipment manufacturer (OEM) of the wireless devices 102 and/or by a third-party affiliated therewith. The IT administrator 302 can start up a locally managed (internal to the business enterprise associated with the IT administrator 302) MDM server 502 and upload the MDM token provided by the business management server 504. The MDM server 502 can subsequently establish a communication link with the business management server 504. Information regarding the one or more wireless devices 102 of the user, e.g., from a purchase order number that summarizes their information and/or device serial numbers obtained from an internal database or from a user of the one or more wireless devices 102, can be provided to the business management servers 504 to register the one or more wireless devices 102 for remote management of services, including for example cellular wireless services, by the IT administrator 302. The local MDM server 502 at the business enterprise can obtain a list or registered devices, including the one or more wireless devices 102 of the user, from the business management server 504. Subsequently, a wireless device 102 can initiate a device activation procedure during which the wireless device 102 can contact an activation server 506. In some instances, the activation server 506 is managed by the same entity or an affiliate thereof as the business management server 504. In some instances, the activation server 506 is managed by an original equipment manufacturer (OEM) of the one or more wireless devices 102, e.g., by Apple Inc. The activation server 506 can send a query to the business management server 504 to determine whether the wireless device 102 has been previously registered for automated device enrollment in remote wireless device management services. When a record for the wireless device 102 is found, the business management server 504 provides a reply message that includes cloud service configuration information, such as a network address, e.g., a universal resource locator (URL), for the MDM server 502 of the business enterprise with which the wireless device 102 will be associated. The activation server 506 provides to the wireless device 102 a configuration file that includes the MDM server 502 network address (e.g., URL) embedded within. The wireless device 102 uses the MDM server 502 network address to obtain from the MDM server 502 an MDM profile to install on the wireless device 102. The MDM profile can allow the wireless device 102 and the MDM server 502 to establish a management communication channel between them as needed for management of device software, settings, and services, including cellular wireless service credentials, such as eSIMs 208 installed (or to be installed) on the wireless device 102 and managed remotely by the IT administrator 302 via the MDM server 502.

FIG. 5B illustrates a flowchart 510 of an example of MDM enrollment for a wireless device 102 using a configurator application 512. A wireless device 102 is tethered via a wired connection, e.g., a universal serial bus (USB) connection, to a computing device on which is installed a configurator application 512. An IT administrator 302 can configure MDM settings including an address, e.g., a URL value, for an MDM server 502 using the configurator application 512 to communicate with the wireless device 102. The wireless device 102 can subsequently establish a connection with the MDM server 502 and obtain from the MDM server 502 to install on the wireless device 102. The MDM profile can allow the wireless device 102 and the MDM server 502 to establish a management communication channel between them as needed for management of device software, settings, and services, including cellular wireless service credentials, such as eSIMs 208 installed (or to be installed) on the wireless device 102 and managed remotely by the IT administrator 302 via the MDM server 502.

Figure 5C:
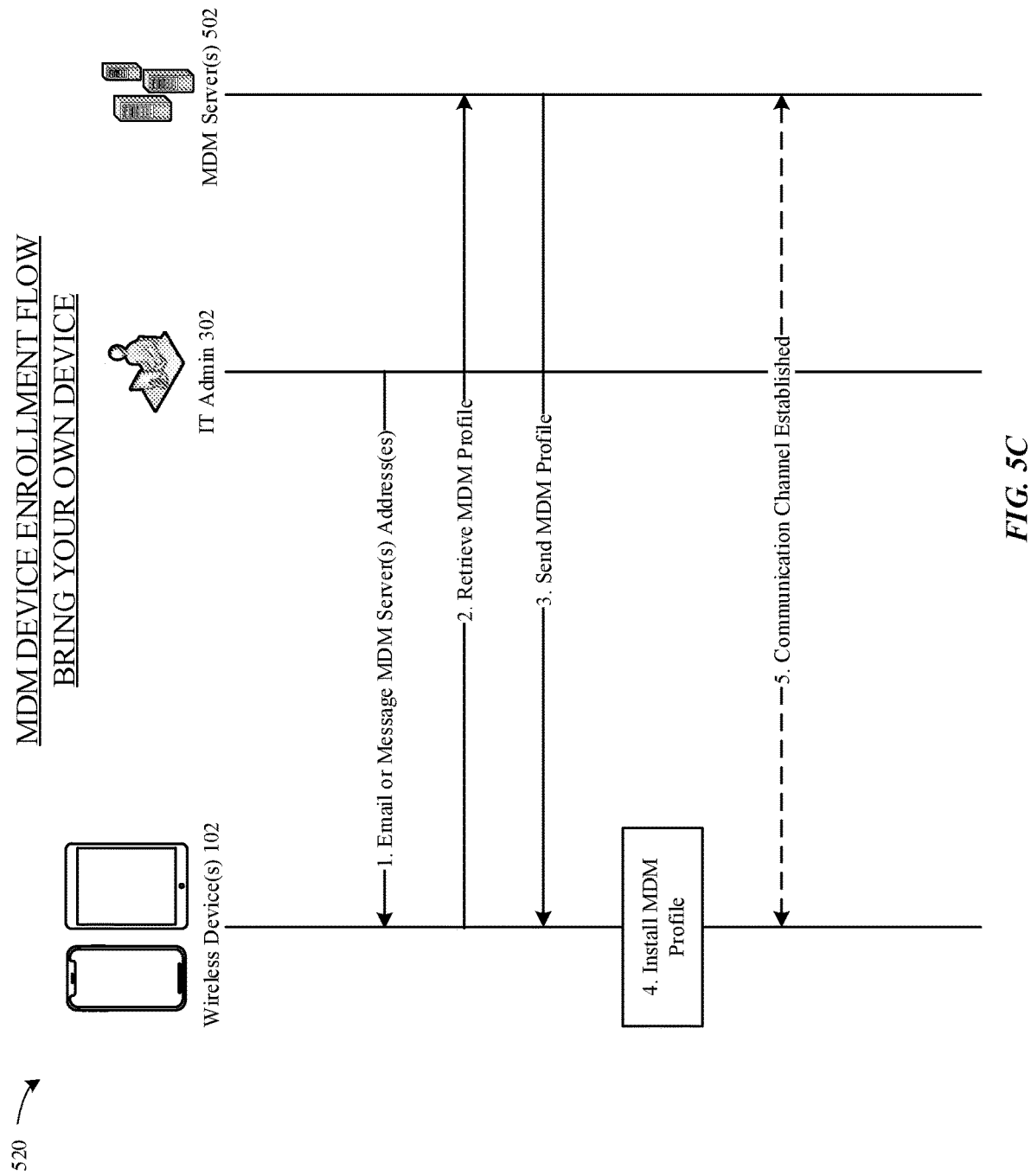
FIG. 5C illustrates a flowchart of an example of MDM enrollment for a user-supplied wireless device, according to some embodiments.

FIG. 5C illustrates a flowchart 520 of an example of MDM enrollment for a user-supplied wireless device 102. An IT administrator 302 directs a user to enroll at an MDM server 502 via an enrollment URL by sending an email or text message to the wireless device 102 of the user, the email or text message including the MDM server network address (URL) at which the wireless device 102 can be enrolled in the MDM system. The wireless device 102 can connect to the MDM server 502, e.g., by opening the network address URL, and obtain an MDM profile to install on the wireless device 102. With the MDM profile installed on the wireless device 102, a communication channel is established between the wireless device 102 and the MDM server 502 through which the wireless device 102 can be remotely managed, e.g., for installation of an eSIM 208, control of wireless device 102 settings, installation and configuration of company-approved applications, etc.

FIG. 5D illustrates a diagram 530 of an example of eSIM 208 provisioning to a wireless device 102 via an MDM system. After the wireless device 102 has enrolled for MDM with the MDM server 502, an IT administrator 302 can send one or more MDM commands that cause the MDM server 502 to push MDM commands to the wireless device 102. The MDM server 502 can push a set of corporate configuration settings for the wireless device 102 as part of an eSIM 208 installation procedure. The wireless device 102 can install the eSIM 208 in the background without disturbing use of the wireless device 102 by the user. Should eSIM 208 installation fail, the MDM server 502 can provide notification of the failure to the IT administrator 302. The IT administrator 302 can re-send one or more MDM commands, e.g., an eSIM 208 installation command, to cause the wireless device 102 to re-attempt installation of the eSIM 208. The installation of an eSIM 208 and of corporate configuration settings to wireless devices 102 by the MDM server 502 can be automated to require minimal manual interaction by the IT administrator 302 and/or by the user of the wireless device 102.

Figure 5E:
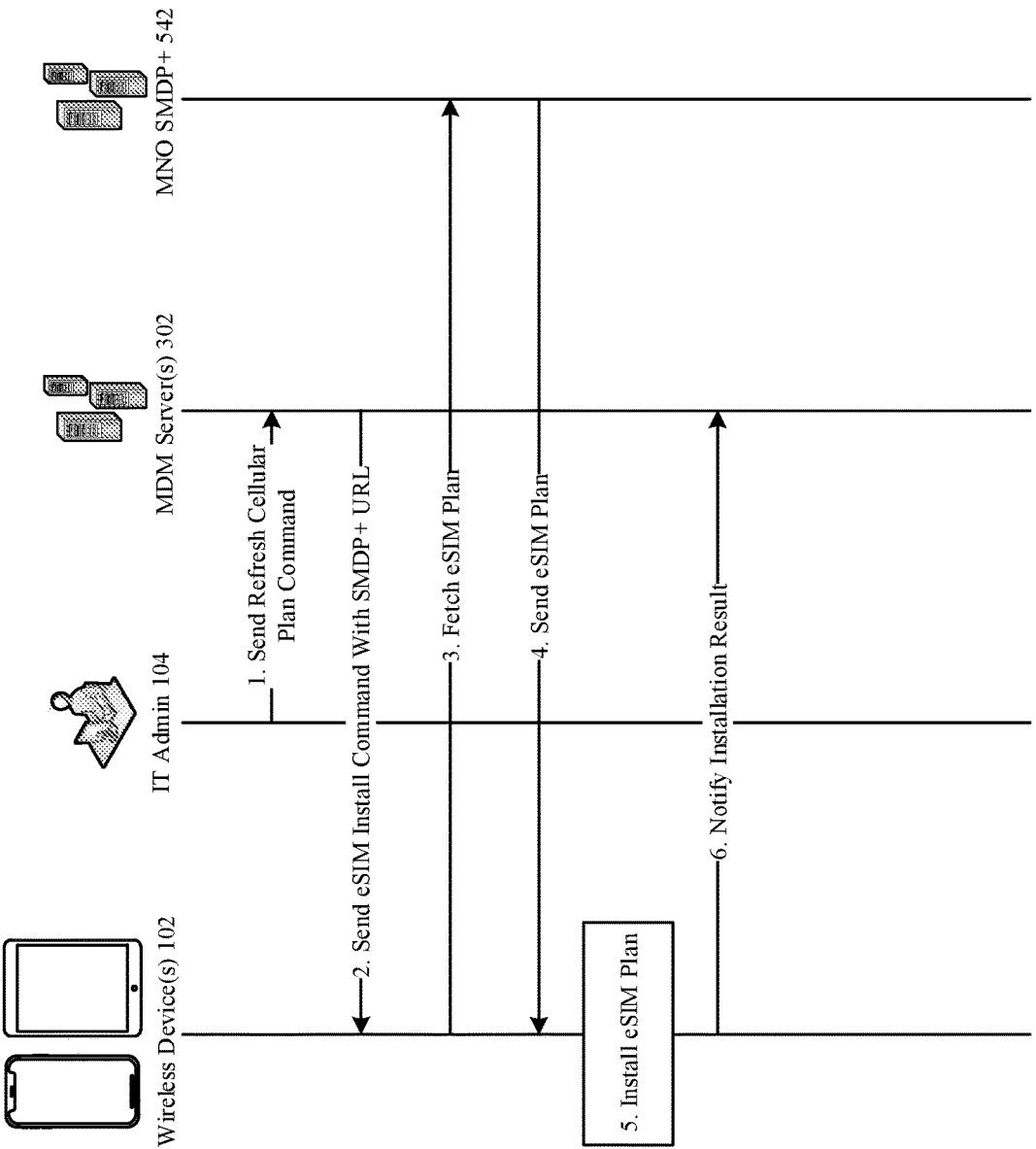
FIG. 5E illustrates a flowchart of an example of MDM eSIM installation for a wireless device, according to some embodiments.

FIG. 5E illustrates a flowchart 540 of an example of eSIM 208 provisioning to a wireless device 102 via an MDM system. An MDM server 502 sends to a wireless device 102 an eSIM 208 installation command that includes a network address, e.g., a URL, for an MNO provisioning server 116, e.g., an MNO Subscription Manager Data Preparation (SMDP+) 542 server. The eSIM 208 installation command can be sent manually by an IT administrator 302, e.g., by sending a Refresh Cellular Plan command, or can occur automatically by the MDM server 502, e.g., as previously set up by the IT administrator 302 for management of the wireless device 102. The MDM server 502 can have pre-stored network addresses for applicable MNO provisioning servers 116, e.g., MNO SMDP+ 542 servers, from which one or more eSIMs 208 can be downloaded to the wireless device 102. The wireless device 102 can retrieve the eSIM 208 from the MNO SMDP+ 542 server and install the eSIM 208 on an eUICC 108 of the wireless device 102. The wireless device 102 can notify the MDM server 502 of an eSIM 208 installation result, e.g., success or failure, which can be forwarded to the IT administrator 302. Should installation of the eSIM 208 fail, the IT administrator 302 can cause the MDM server 502 to re-attempt installation of the eSIM 208 to the wireless device 102, e.g., by re-sending the Refresh Cellular Plan command. In some instances, the MDM server 502 can be configured to re-send the Refresh Cellular Plan command in response to a failure indication for a previous eSIM 208 installation without intervention by the IT administrator 302. Multiple attempts can be configured up to a threshold maximum number of retries.

Figure 5F:
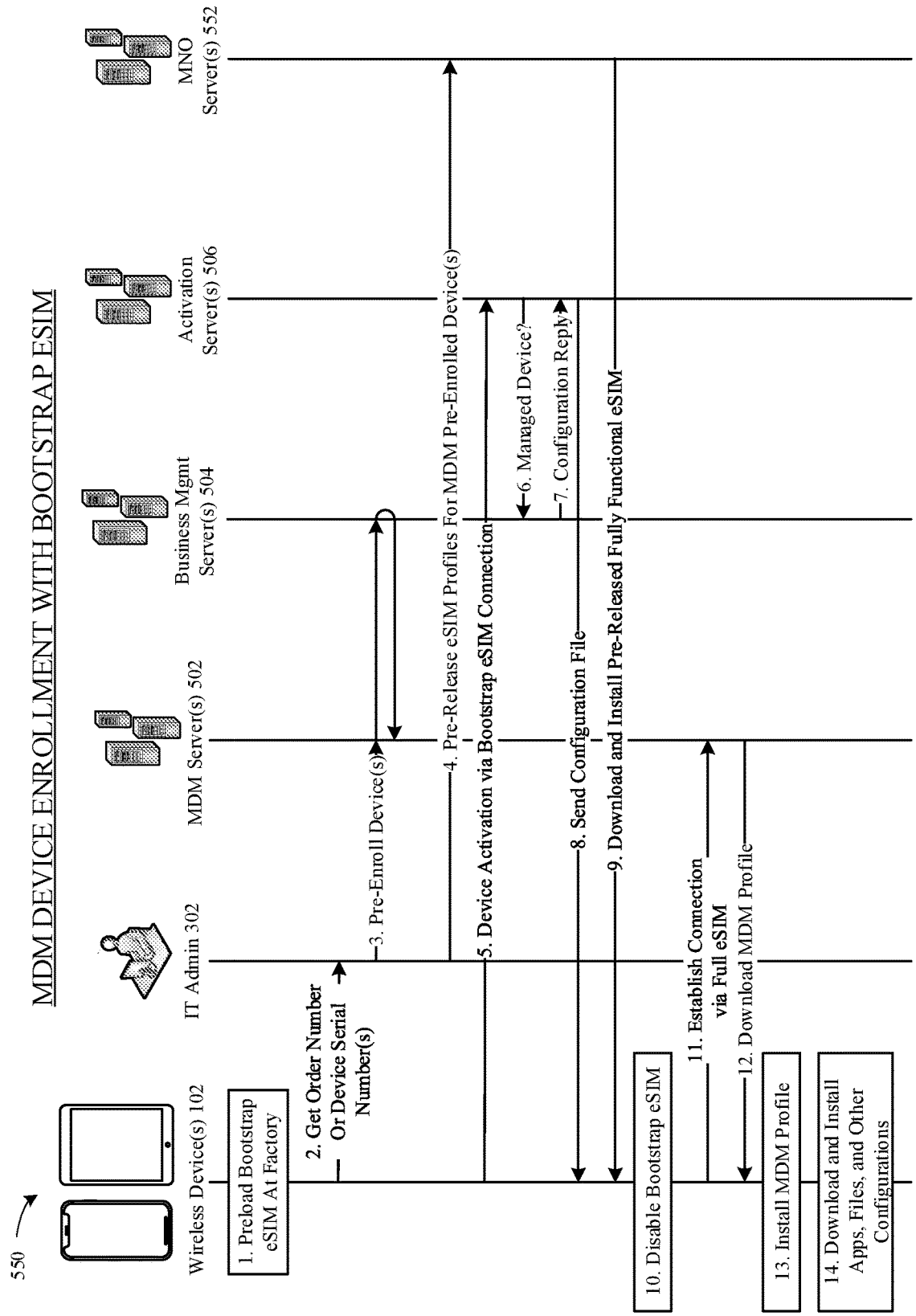
FIG. 5F illustrates a flowchart of an example of MDM wireless device enrollment for a wireless device with a bootstrap eSIM, according to some embodiments.

FIG. 5F illustrates a flowchart 550 of an example of MDM device enrollment for a wireless device 102 that includes a limited functionality, bootstrap eSIM 208. One or more wireless devices 102 can be preloaded with limited functionality, bootstrap eSIMs 208 at a time of manufacture at an OEM factory. An IT administrator 302 of an organization that plans to acquire and remotely manage a set of wireless devices 102 can obtain via a sales order or other similar process a set of serials numbers for the set of wireless devices 102. The IT administrator 302 can perform a pre-enrollment process for the set of wireless devices 102 by communicating device information to one or more MDM servers 502 and/or one or more business management servers 504. In some scenarios, the set of mobile wireless devices 102 (or at least one of them) can be expected to be activated in a location that lacks a separate wireless local area network, e.g., Wi-Fi, connection and without a fully functional eSIM 208 or fully functional physical SIM (pSIM) installed. Examples scenarios include wireless devices 102 in use at remote locations, by emergency responders, during emergency events, such as by the federal emergency management agency (FEMA) workers. Additional scenarios includes wireless devices 102 provided for local, state, or federal field support units, and wireless devices 102 supplied for educational use, such as at home, remote study, where in some cases access to wireless local area network or fully functional cellular connections may be unavailable, at least during a portion of activation and/or setup processes. As such, the organization can plan for activation and setup of a wireless device 102 to occur instead using the pre-installed limited functionality, bootstrap eSIM 208 instead, at least until a fully functional eSIM 208 can be downloaded and installed to the wireless device 102. The limited functionality, bootstrap eSIM 208 can allow for local and/or global cellular roaming capability with limited connectivity (restricted access to one or more particular network access point names) and restricted data traffic (only for use by the activation and setup processes and not for normal customer data use). In some embodiments, use of the limited functionality, bootstrap eSIM 208 can be restricted to situations in which alternative access via another non-cellular connection or fully functional cellular connection is not available to the wireless device 102. The IT administrator 302 can communicate with an MNO 114, e.g., by communicating with one or more MNO servers 552 (which can include any of front-end, back-end, customer support, administrative function, service provisioning servers managed by the MNO 114) to pre-release fully functional eSIMs 208 for the set of wireless devices 102, where the IT administrator 302 provides unique identifiers for the set of wireless devices 102 to the MNO 114, e.g., EID values for the eUICCs 108 of the wireless devices 102 on which the eSIMs 208 will be later installed. In some scenarios, the IT administrator 302 (or another representative of the organization purchasing and/or managing the set of wireless devices 102) accepts a set of terms and conditions for cellular wireless service to be used later for the set of wireless devices 102.

After delivery to an end user, the wireless device 102 can execute an "out-of-box" device activation process using a cellular wireless connection to one or more activation servers 506 based credentials of the limited functionality, bootstrap eSIM 208 pre-loaded in the wireless device 102. The activation servers 506 can communicate with business management servers 504 to determine whether the wireless device 102 is pre-configured as a managed device. When the wireless device 102 is configured as a managed device, the activation servers 506 can provide a cloud configuration file to the wireless device 102. The cloud configuration file can include one or more of: MDM system information, an MNO provisioning server 116 network address, e.g., a URL or FQDN for an MNO SMDP+ 542, or a device manufacturer device services server (which can be one of the activation servers 506) to provide information to the wireless device 102. The wireless device 102 can use information from the cloud configuration file to determine a network address for an MNO SMDP+ 542 (which can be one of the MNO servers 552) from which to download and install the previously pre-released, fully functional eSIM 208 for the wireless device 102. In some embodiments, the cloud configuration file includes the network address of the MNO SMDP+ 542. In some embodiments, the cloud configuration file includes a network address for a device manufacturer device services server from which to obtain the network address of the MNO SMDP+ 542. In some embodiments, the wireless device 102 obtains from the device manufacturer device services server an EventID to be used to complete the download and installation of the fully functional eSIM 208 from the MNO SMDP+ 542 server. After installation and activation of the fully functional eSIM 208, the wireless device 102 disables the limited functionality, bootstrap eSIM 208 and establishes a new cellular connection using credentials from the fully functional eSIM 208. After re-establishing the new cellular connection, the wireless device 102 continues the device activation and setup process by downloading and installing an MDM profile from the MDM server 502. The MDM profile can include information for configuring the wireless device 102 as intended by the organization that purchased and will continue to manage the wireless device 102, such as for an emergency services worker, a government employee, an education system employee, or student. The wireless device 102 can download and install various applications, files, books, and other configuration actions performed based on information provided by the MDM profile. The limited functionality, bootstrap eSIM 208 can remain in the wireless device 102 after disablement and be re-enabled if required for management of the wireless device 102 when another cellular wireless or non-cellular wireless connection is unavailable. For example, a cellular wireless service plan associated with the fully functional eSIM 208 can expire, the wireless device 102 an roam out of a coverage area for the cellular service provider (or associated roaming providers) for the fully functional eSIM 208, WLAN (Wi-Fi) coverage is unavailable, etc. In some embodiments, the limited functionality, bootstrap eSIM 208 is re-enabled to install another fully functional eSIM 208 or to manage MDM plans or cellular wireless service plans for the wireless device 102.

Figure 5G:
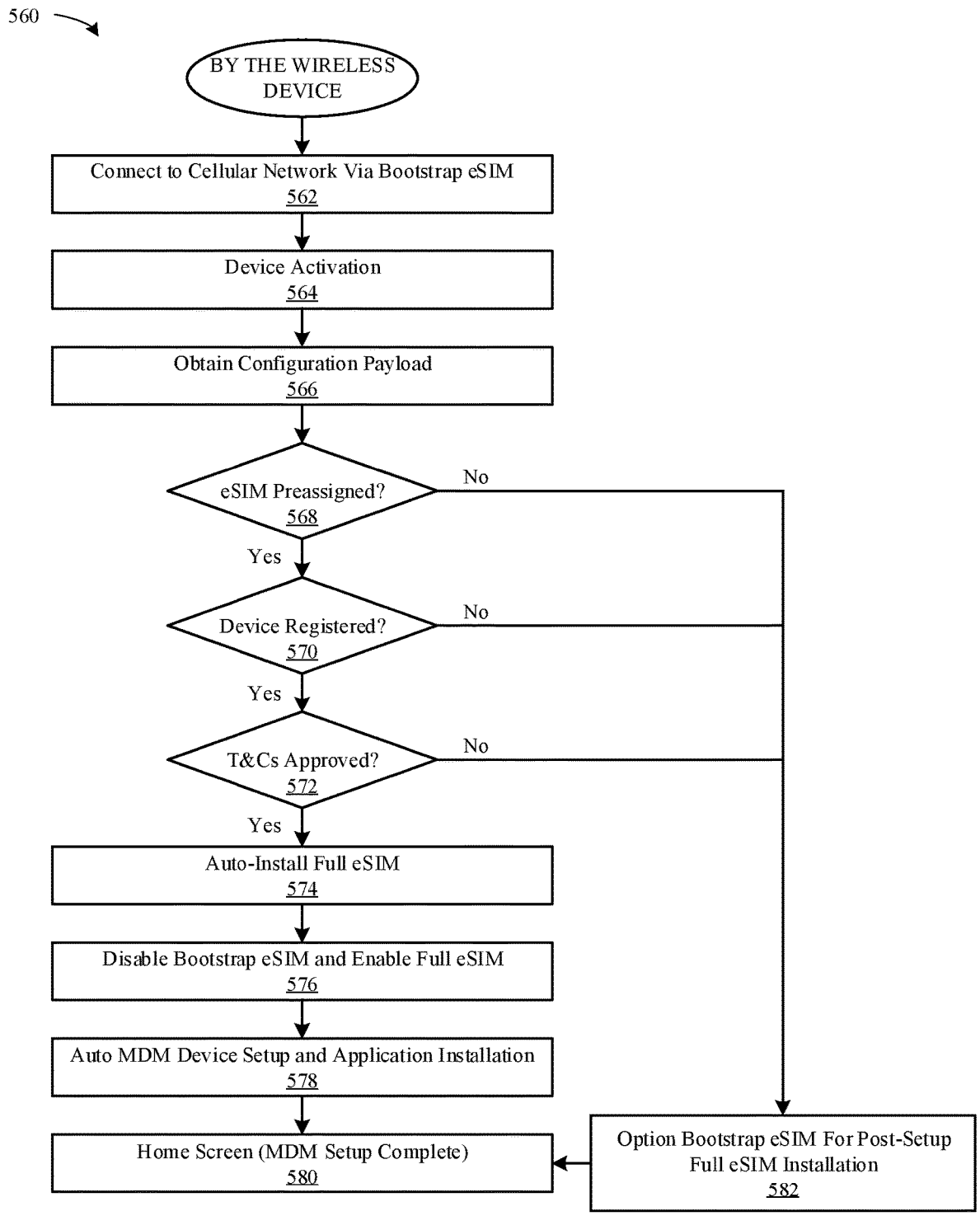
FIG. 5G illustrates a flowchart of an example of an activation flow for an MDM wireless device with a bootstrap eSIM, according to some embodiments.

FIG. 5G illustrates a flowchart 560 of an example of an activation flow for an MDM wireless device 102 with a limited functionality, bootstrap eSIM 208 pre-installed at a time of manufacture. The activation flow can be initiated as part of an unboxing or other setup process for the wireless device 102. At 562, the wireless device 102 connects to a cellular wireless network using credentials of the limited functionality, bootstrap eSIM 208. In some embodiments, when a wireless local area network (or other non-cellular) connection is available or when a fully functional eSIM 208 or physical SIM is installed in the wireless device 102, the activation and configuration process can preferentially use the non-cellular connection or fully functional cellular connection and refrain from establishing a cellular connection using the limited functionality, bootstrap eSIM 208. When no non-cellular or fully functional cellular connection is available, the wireless device 102 connects to the cellular wireless network using the bootstrap eSIM 208. At 562, the wireless device 102 performs a device activation process with one or more activation servers via the connection provided by the bootstrap eSIM 208. At 566, the wireless device 102 obtains a configuration payload, which can indicate that the wireless device 102 is a managed device and provide information that has been prearranged for the wireless device 102. At 568, the wireless device 102 determines, based at least in part on the configuration payload, whether an eSIM has been pre-assigned for use by the wireless device 102. At 570, the wireless device 102 determines whether the wireless device 102 has been registered for remote MDM service, e.g., by an IT administrator of the organization that acquired the wireless device 102. At 572, the wireless device 102 determines whether terms and conditions for the cellular wireless service provider associated with the preassigned eSIM 208 have been approved. When any of the conditions at 568, 570, or 572 are not met, the wireless device 102, at 582, can optionally configure to use the bootstrap eSIM 208 for full eSIM 208 installation after the setup process completes. When all of the conditions tested at 568, 570, and 572 are satisfied, the wireless device 102 can proceed with an automatic downloading and installation of a fully functional (pre-assigned) eSIM 208 from an MNO provisioning server 116 (e.g., SMDP+ 542) associated with the fully functional eSIM 208. At 576, after installation and activation of the fully functional eSIM 208, the wireless device 102 can disable the bootstrap eSIM 208 and enable connectivity with the fully functional eSIM 208. At 578, the wireless device 102 can continue with an automatic MDM device setup procedure and install associated applications, files, data, books, tools, etc. At 580, after completion of the MDM setup process, the wireless device 102 can return to a home screen user interface. The steps shown in FIG. 5G can be performed with minimal interaction by the user of the wireless device 102. In some embodiments, the steps can be performed automatically upon power on the wireless device 102 without requiring the user to enter any information. In this manner, initial activation, setup, and configuration for a particular organization with remote management of the wireless device 102 can be accomplished with zero touch by the user of the wireless device 102.

Figure 6:
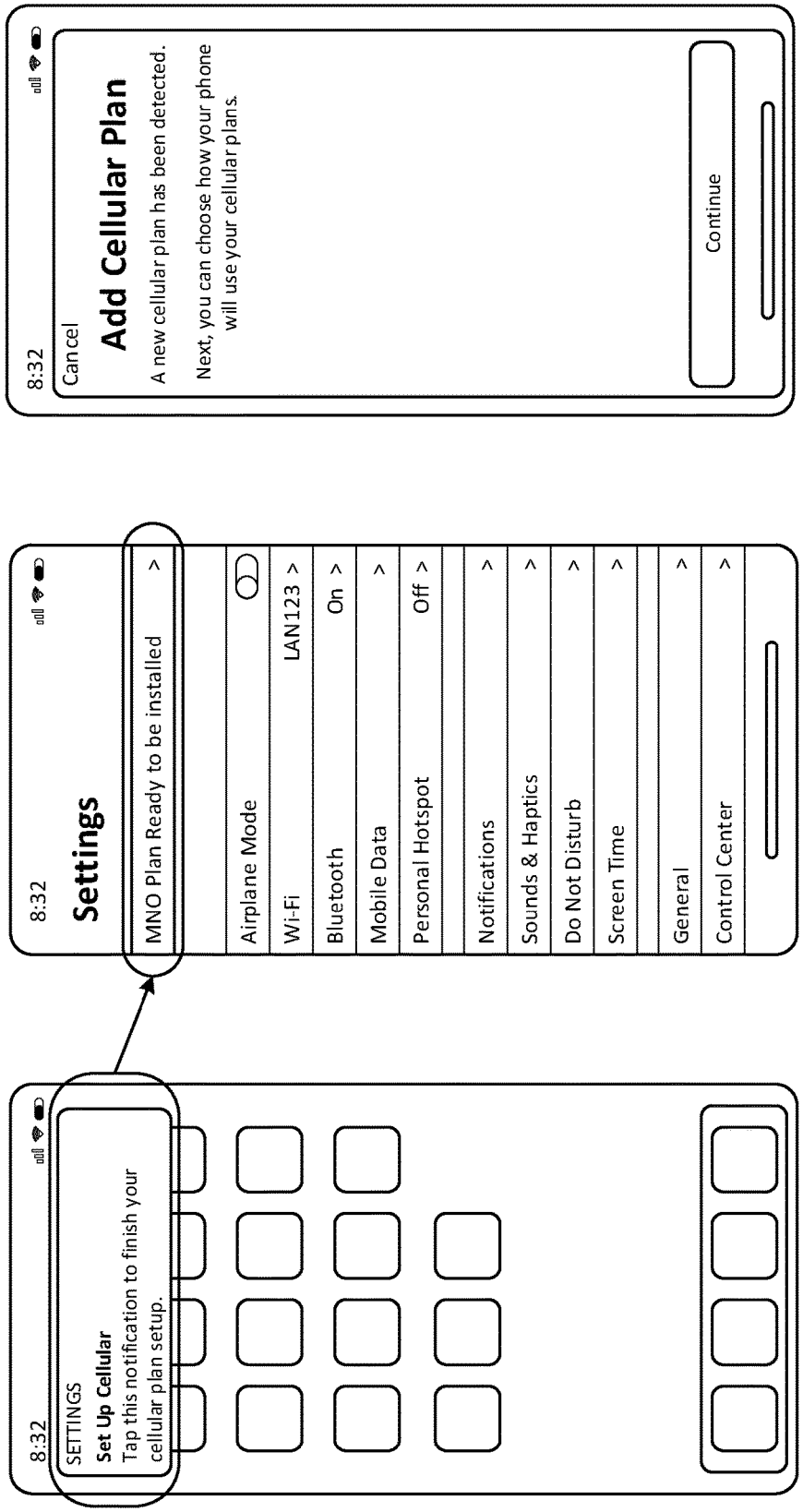
FIG. 6 illustrates an example of cellular service plan management with dual profiles for a wireless device, according to some embodiments.

FIG. 6 illustrates a diagram 600 of an example of cellular service plan management with dual profiles (SIMs and/or eSIMs 208) on a wireless device 102. A dual profile wireless device 102 can allow a user to select one profile (e.g., a SIM or eSIM 208) to use for personal communication and a second profile (e.g., another SIM or eSIM 208) for business enterprise usage. In some instances, a user can provide a wireless device 102 that already includes a profile for personal use and on which an eSIM 208 can be installed for business enterprise use. Both a personal use profile and a business enterprise use profile can be active on the wireless device 102 at the same time. When installation of an eSIM 208 on the wireless device 102 for business enterprise use, e.g., via the MDM system, results in a dual profile mode, e.g., when a single SIM/eSIM was the only active SIM/eSIM on the wireless device 102 prior to installation of the business enterprise eSIM 208, a user of the wireless device 102 can be prompted to set up configurations for use of the dual profiles on the wireless device 102. Exemplary configurations include i) user-supplied labels for each of the profiles, ii) selection of a default profile to use for mobile-originated cellular wireless voice connections and/or cellular wireless messaging services, e.g., short messaging service (SMS); iii) selection of a profile to use for application-based messaging services, e.g., iMessage® and/or application-based voice/video connections, e.g., FaceTime®; iv) selection of a default profile to use for data connections (and/or whether data connections are allowed for each of the profiles). To reduce intrusive notification alerts for configuration of the dual profile setup, a simple notification alert can be provided with an option for subsequent follow-up for the user to configure the dual profile setup. When installation of an eSIM 208 on the wireless device 102 for business use, e.g., via the MDM system, does not result in a dual profile mode, notification and prompted follow-up for configuration may be not required and thus may not occur. When a dual profile mode configuration does occur, a user can tap on the notification alert to enter a configuration flow that launches a cellular wireless service plan configuration user interface (UI) through which the user can configure the dual profile mode for the wireless device 102. In some instances, a user can dismiss the notification alert, which can result in a pending follow-up item that awaits user action to complete, e.g., by configuring the dual profile mode via a settings menu.

Figure 7:
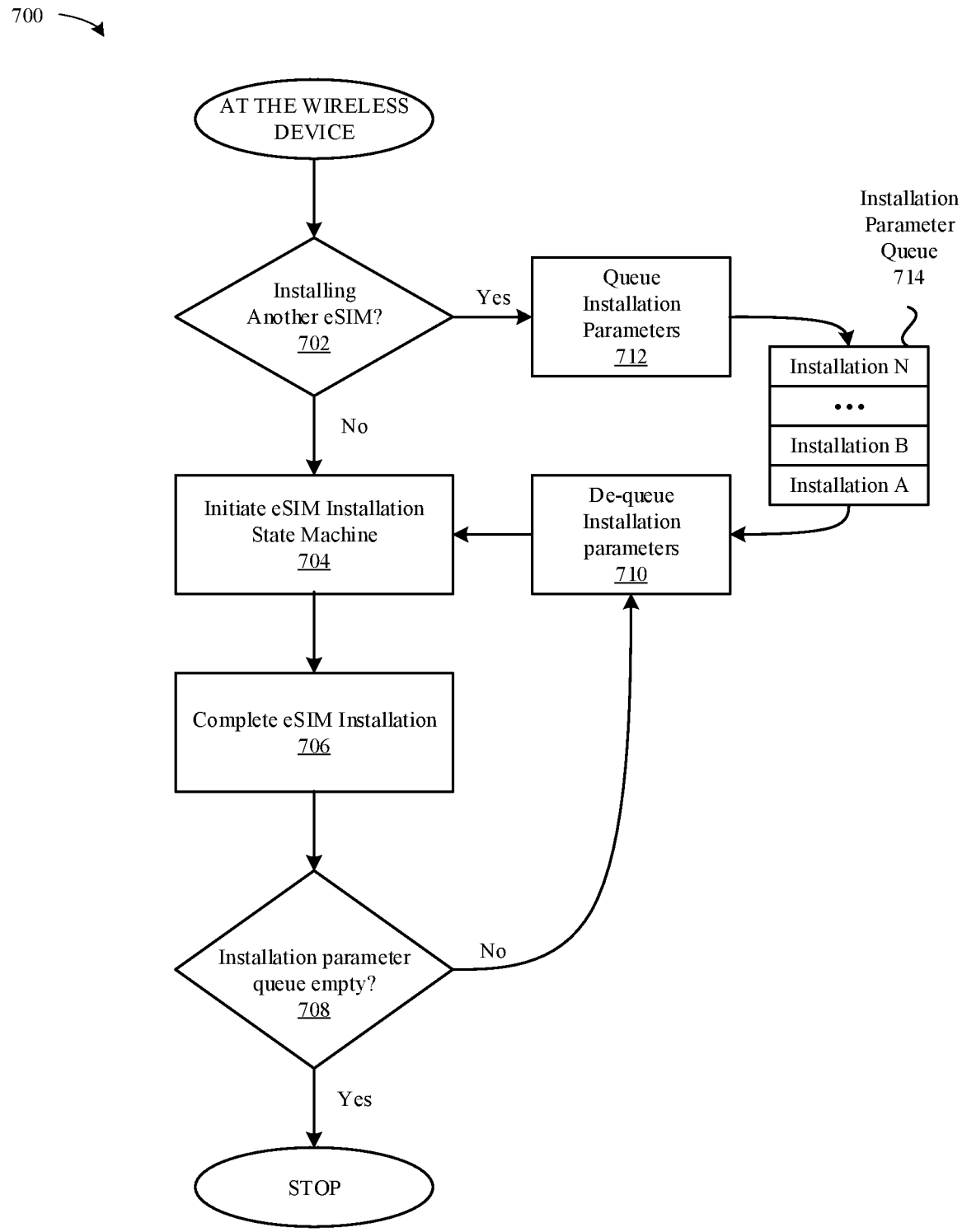
FIG. 7 illustrates a flowchart of an example of eSIM installation queuing for a wireless device, according to some embodiments.

FIG. 7 illustrates a flowchart 700 of an example of eSIM 208 installation queuing for a wireless device 102 to handle a scenario in which a second eSIM 208 installation can collide with an ongoing first eSIM 208 installation. In some instances, a wireless device 102 can be triggered to install multiple eSIMs 208 at the same time. For example, a wireless device 102, e.g., an iPad, can be in the process of installing a bootstrap profile during initial configuration of the wireless device 102, and an MDM command can be received by the wireless device 102 to install a business enterprise eSIM 208 on the wireless device 102. Installation of the business enterprise eSIM 208 would collide with the ongoing installation of the bootstrap profile, and therefore, installation of the business enterprise eSIM 208 can be deferred until after completion of the bootstrap profile installation on the wireless device 102. In some instances, multiple, distinct communication paths to a wireless device 102 can initiate installation of one or more eSIMs 208 to the wireless device 102. For example, an OEM-managed network-based server can send a first message to the wireless device 102 regarding installation of a first eSIM 208, while the MDM system can separately send a second message to the wireless device 102 regarding installation of a second eSIM 208. Installation of the two eSIMs 208 can interfere with each other, and therefore the wireless device 102 can manage parallel attempts to install one or more eSIMs 208 to the wireless device 102. When a first eSIM 208 installation is in process, a second eSIM 208 installation can be queued for subsequent handling when the first eSIM 208 installation completes. Parameters of the first eSIM 208 installation can be compared with parameters for the second eSIM 208 installation to ensure duplicate installation of the identical eSIM 208 is not attempted.

At 702, the wireless device 102 determines whether an eSIM 208 installation is in process. When an eSIM 208 installation is ongoing, at 712, installation parameters for another eSIM 208 can be queued in an installation parameter queue 714 for subsequent installation. When no eSIM 208 installation is ongoing at 702, the wireless device 102 can initiate installation of an eSIM 208, e.g., by de-queuing installation parameters at 710 from the installation parameter queue 714, initiating an eSIM installation state machine at 704, and completing installation of the eSIM 208 at 706. The wireless device 102 can determine, at 708, whether the installation parameter queue 714 is empty or stores installation parameters for additional eSIMs 208. When the installation parameter queue 714 is not empty, the wireless device 102, at 710 can de-queue, a set of installation parameters for an eSIM 208 from the installation parameter queue 714 and re-initiate the eSIM installation state machine at 704 resulting in eSIM installation completion at 706. The process of determining whether the installation parameter queue is empty, at 708, de-queuing installation parameters at 710, re-initiating the eSIM installation state machine at 704, and completing installation of the eSIM 208 at 706, can repeat until the installation parameter queue 714 is empty.

FIG. 8 illustrates an exemplary table 800 of MDM commands useful for managing eSIMs 208 on a wireless device 102. MDM commands for eSIM 208 management can include one or more of the following commands: i) a Refresh Cellular Plan command, as described earlier, that can send a network address for an MNO provisioning server 116, e.g., an SMDP+ 542 URL, to a wireless device 102 to trigger eSIM 208 downloading to and installation at the wireless device 102; ii) a Prohibit New eSIM Addition command to disable an option for adding an eSIM 208, e.g., by disabling display of and/or an ability to select an "Add Cellular Plan"

button in a configuration settings control UI for the wireless device 102; iii) a Prohibit eSIM Deletion command to disable an option to remove an eSIM 208, e.g., by disabling display of and/or an ability to select a "Remove Cellular Plan" button in a configuration settings control UI for the wireless device 102; iv) a Delete Cellular Plans command to cause cellular data plan information to be backed up via the MDM system, e.g., by using an Erase Device command with a Preserve Data Plan option; v) a Limit Application Data Usage command to prevent applications resident on the wireless device 102 from using (or limiting their data usage to a threshold data usage amount) a particular eSIM 208 (or set of eSIMs) for data communication; vi) a Disable Physical SIM Slot command to cause a physical SIM slot of the wireless device 102 to not be usable on the business enterprise controlled wireless device 102, and thereby limit cellular communication of the wireless device 102 to use a business enterprise assigned eSIM 208 to and installed on the wireless device 102; vii) an eSIM Selection command to force selection of a particular business enterprise provided eSIM 208 on the wireless device 102 and disallow selection of a personal eSIM 208 on the wireless device 102, thereby restricting cellular wireless communication capabilities of the wireless device 102 to only use the business enterprise assigned eSIM 208; viii) a Set Data Usage Quota command that limits cellular data usage to a threshold data usage amount for a business enterprise provided eSIM 208 on the wireless device 102, e.g., to a maximum of number of Mbytes, GBytes, TBytes or other applicable data usage metric; ix) a Control Roaming Data Usage command to allow or disallow cellular data usage via a business enterprise provided eSIM 208 on the wireless device 102 while roaming; or x) a Limit Cellular Plan Usage command to limit use of a business enterprise provided eSIM 208 (or another eSIM 208) on the wireless device 102 to be only for voice connections or only for data usage.

Figure 9A:
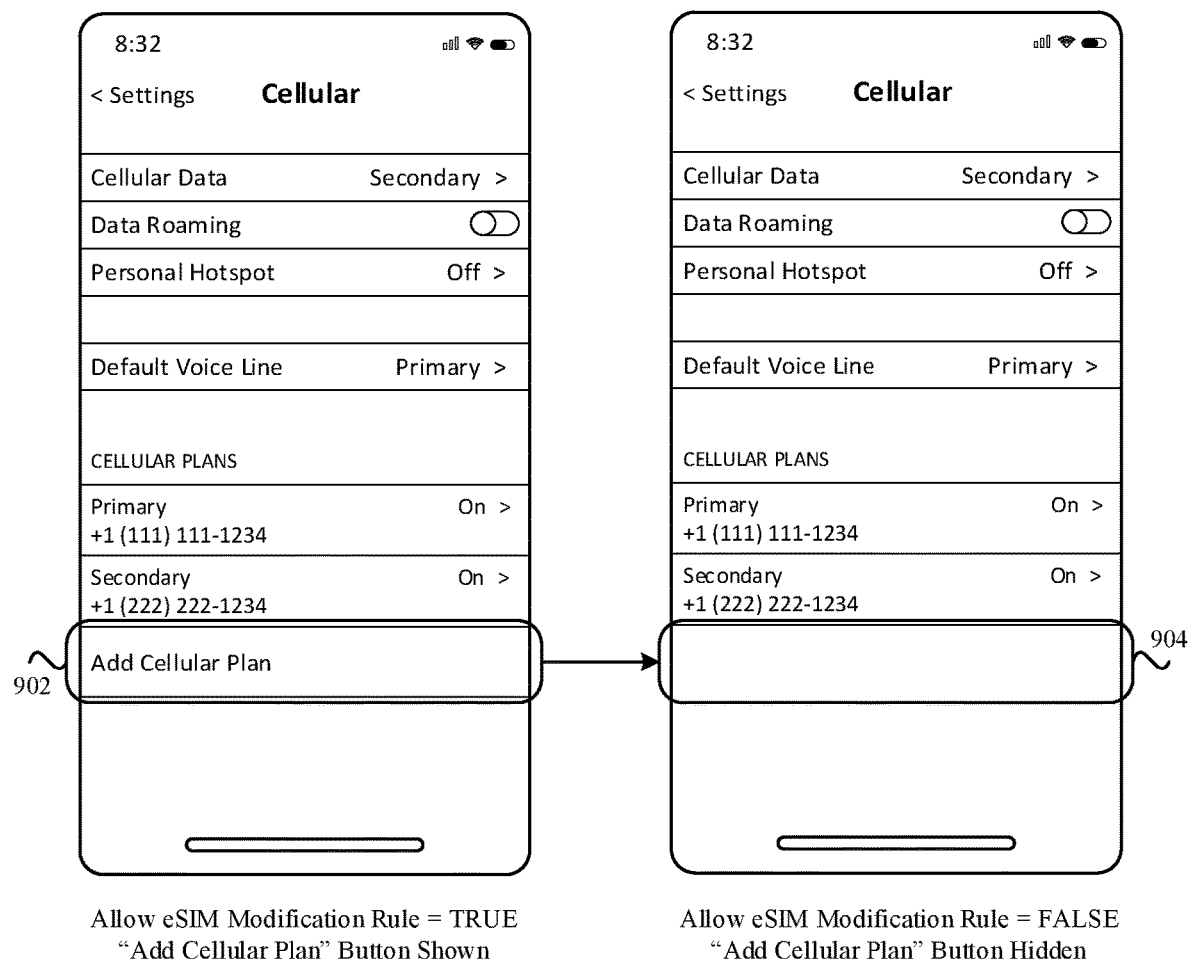
FIG. 9A illustrates an example of controlling access to eSIM installation for a wireless device, according to some embodiments.

FIG. 9A illustrates a diagram 900 of an example of controlling access to eSIM 208 installation for a wireless device 102. A rule for control of eSIM modification, e.g., a stored setting having a binary value representing TRUE or FALSE can be used to determine whether a button for eSIM 208 addition is displayed on a Settings UI of the wireless device 102. When the eSIM 208 modification rule has a particular binary value, e.g., TRUE, an Add Cellular Plan button can be displayed on the Settings UI of the wireless device 102. When the eSIM 208 modification rule has another particular binary value, e.g., FALSE, the Add Cellular Plan button can be not displayed on the Settings UI of the wireless device 102. A business enterprise, e.g., via the MDM system, can control display of the Add Cellular Plan button by sending a command, e.g., Prohibit Adding New eSIM command, to the wireless device 102, which can set the eSIM 208 modification rule binary value to FALSE to disallow display of the Add Cellular Plan button on the Settings UI of the wireless device 102.

Figure 9B:
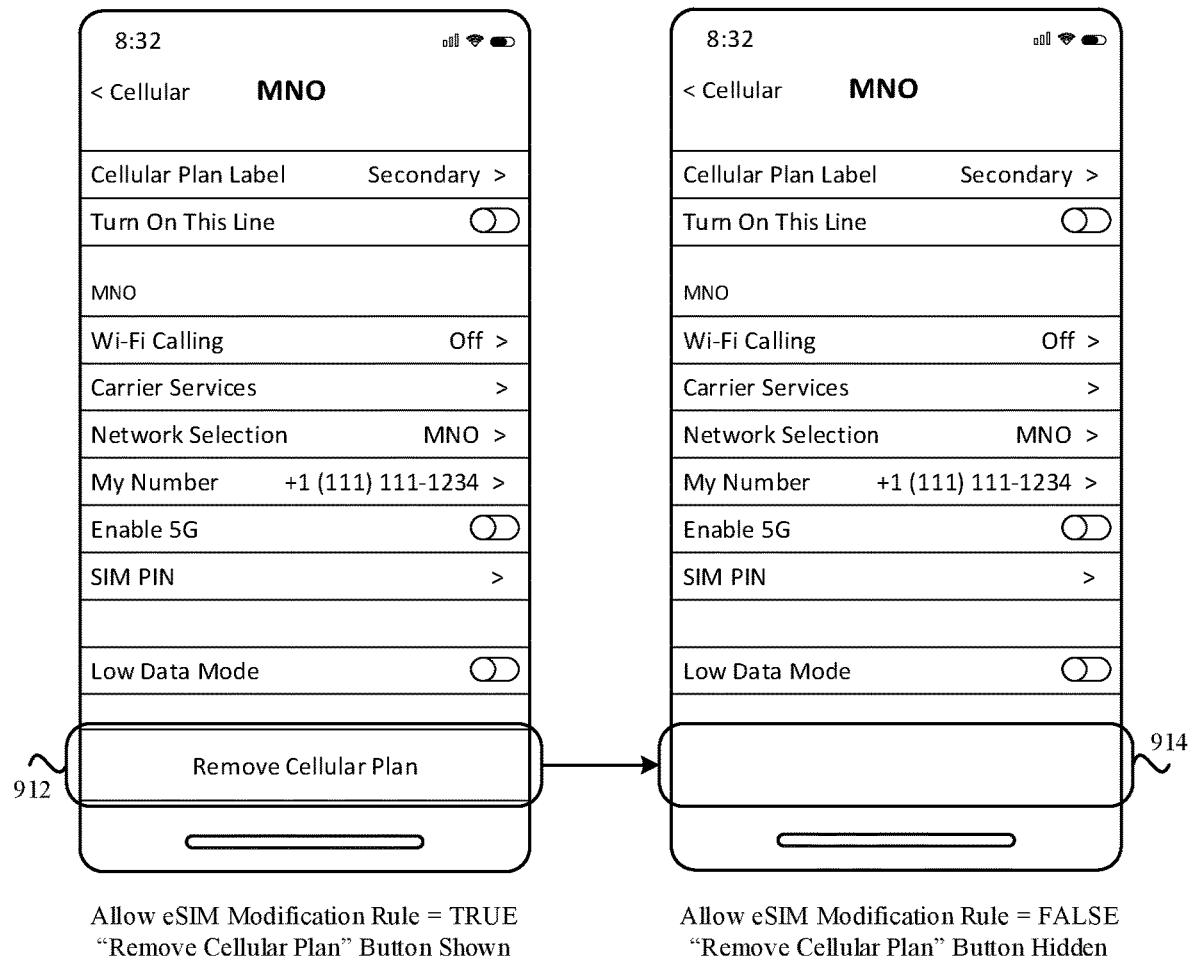
FIG. 9B illustrates an example of controlling access to eSIM deletion for a wireless device, according to some embodiments.

FIG. 9B illustrates a diagram 910 of an example of controlling access to eSIM 208 deletion from a wireless device 102. A rule for control of eSIM modification, e.g., a stored setting having a binary value representing TRUE or FALSE can be used to determine whether a button for eSIM 208 deletion is displayed on a Settings UI of the wireless device 102. When the eSIM 208 modification rule has a particular binary value, e.g., TRUE, a Remove Cellular Plan button can be displayed on the Settings UI of the wireless device 102. When the eSIM 208 modification rule has another particular binary value, e.g., FALSE, the Remove Cellular Plan button can be not displayed on the Settings UI of the wireless device 102. A business enterprise, e.g., via the MDM system, can control display of the Remove Cellular Plan button by sending a command, e.g., Prohibit eSIM Deletion command, to the wireless device 102, which can set the eSIM 208 modification rule binary value to FALSE to disallow display of the Remove Cellular Plan button on the Settings UI of the wireless device 102.

In some instances, a business enterprise can use multiple, independent network-based servers to communicate with wireless devices 102 for installation of eSIMs 208 and/or for management of cellular wireless services provided via eSIMs 208 on the wireless devices 102. A lookup server can be managed by an original equipment manufacturer (OEM) of the wireless devices 102 and/or by a third party affiliated the OEM. The lookup server can provide a standardized end-point with which a wireless device 102 can communicate for information, such as when initializing the wireless device 102 upon initial purchase or after a reset. The lookup server can provide information to assist with configuration of the wireless device 102 and/or for cellular wireless communication services for the wireless device 102. In some embodiments, the lookup server can be used by the wireless device 102 to obtain network addresses, e.g., URL values, for an MNO provisioning server 116, e.g., an SMDP+ server 542, which can have a pending eSIM 208 profile available for download to and installation on the wireless device 102. The lookup server can send a push notification message to the wireless device 102 indicating that an eSIM 208 is pending and available at an SMDP+ server 542, for download and installation to the wireless device 102. The push notification message can be sent by the lookup server to the wireless device 102 in response to registration of the pending eSIM 208 by the SMDP+ server 542 with the lookup server. The push notification message to the wireless device 102 can trigger a follow-up alert notification message at the wireless device 102 to which the user of the wireless device 102 can respond. In some embodiments, the alert notification message includes a user consent to installation and use of the eSIM 208 on the wireless device 102. In some embodiments, the eSIM 208 is only installed when the user consents to the alert notification message resulting from the push notification message sent to the wireless device 102 by the lookup server. In some embodiments, the eSIM 208 is not installed when the user does not consent to the alert notification message resulting from the push notification message sent to the wireless device 102 by the lookup server. In some embodiments, a business enterprise uses the lookup server in conjunction with an MDM server 502 to provision and manage eSIMs 208 for wireless devices 102. In some embodiments, a push notification message to a wireless device 102 regarding installation of an eSIM 208 can overlap with installation of an eSIM 208 initiated by the MDM server 502. The push notification message from the lookup server to install an eSIM 208 can arrive before, during, or after installation of an eSIM 208 by the MDM server 502. Similarly, an MDM command from the MDM server 502 with information to cause download and installation of an eSIM 208 can overlap with installation of an eSIM 208 initiated by a push notification message from the lookup server. As described further herein, the wireless device 102 can handle different scenarios with overlapping eSIM 208 installation to manage applicable alert notification messages, e.g., consent notifications, and/or error messages, e.g., eSIM failure indications, to reduce unnecessary interruption of the user of the wireless device 102. Consent notifications for eSIM 208 installation via the lookup server are not required for eSIM 208 installation via the MDM server 502, when the user of the wireless device 102 has previously consented to installation of the MDM profile for management of cellular wireless services provided by cellular service credentials, e.g., eSIMs 208, on the wireless device 102.

Figure 10A:
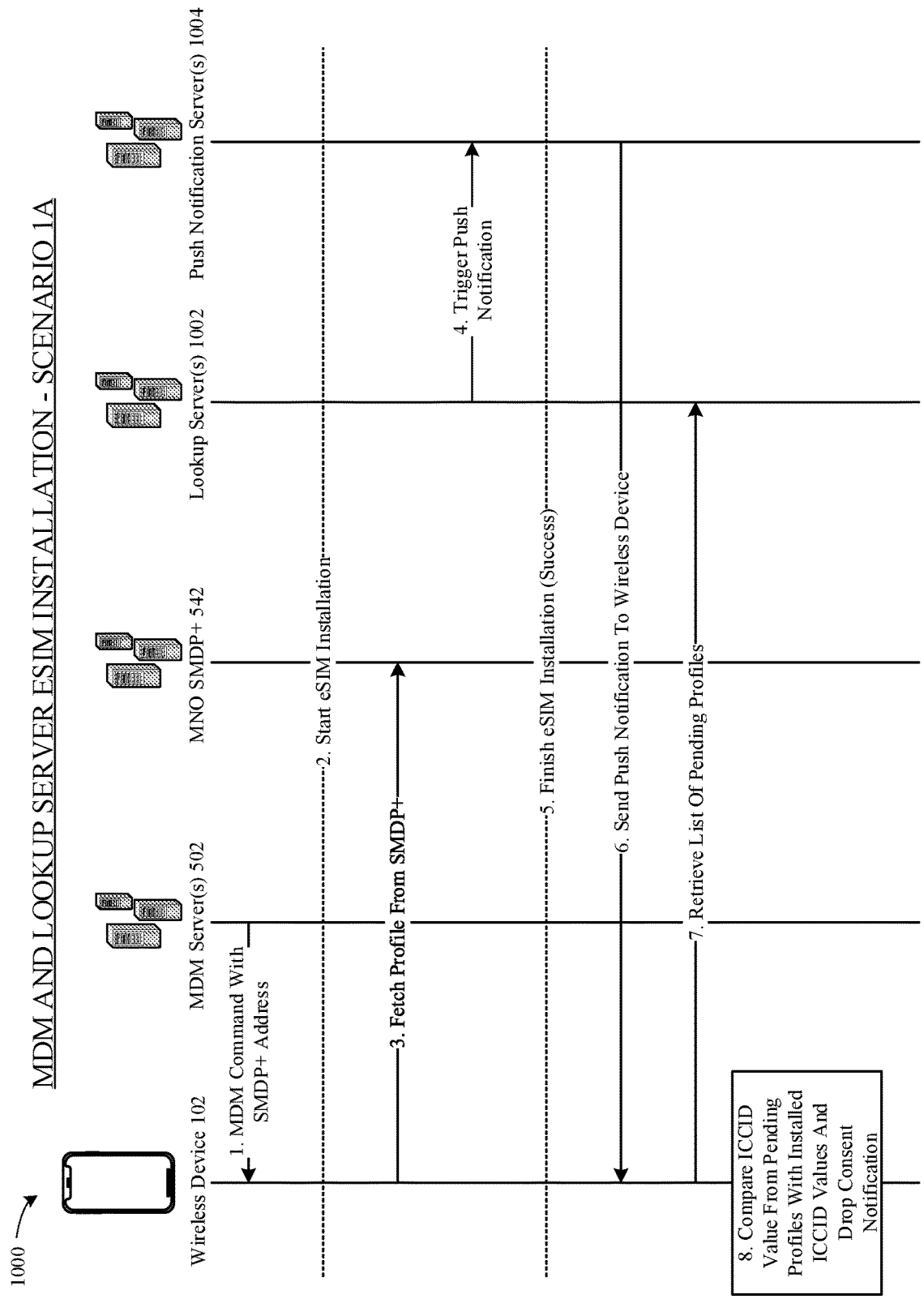
FIGS. 10A to 10C illustrate examples of managing eSIM installations initiated by multiple network-based servers, according to some embodiments.

FIG. 10A illustrates a diagram 1000 of an exemplary message exchange sequence for managing an eSIM installation initiated by multiple network-based servers. In the example of FIG. a wireless device 102 receives a push notification from a second server, e.g., from a push notification server 1004, after completing installation of an eSIM 208 triggered by an MDM command received from a first server, e.g., from an MDM server 502.

An MDM server 502 sends an MDM command to the wireless device 102 with a network address, e.g., a URL value, for an MNO provisioning server 116, e.g., an MNO SMDP+ 542, to cause the wireless device 102 to initiate download and installation of an eSIM 208 from the MNO SMDP+ 542. The wireless device 102 retrieves the eSIM 208 from the MNO SMDP+ 542. The wireless device 102 obtains a unique identifier value, e.g., an integrated circuit card identifier (ICCID) value for the eSIM 208 from the MNO SMDP+ 542 in an ES9 authenticate client response message. Before completion of the installation of the eSIM 208 by the wireless device 102, a lookup server 1002 sends a message to a push notification server 1004 to trigger a push notification message to the wireless device 102. In the example illustrated in FIG. 10A, the push notification message from the push notification server 1004 is received at the wireless device 102 after successful completion of installation of the eSIM 208 triggered by the MDM command from the MNO SMDP+. Responsive to receipt of the push notification message from the push notification server 1004, the wireless device 102 retrieves from the lookup server 1002 a list of pending profiles, e.g., eSIMs 208, pending for the wireless device 102. In some embodiments, the push notification message from the push notification server 1004 and/or the list of pending profiles from the lookup server 1002 include an MNO provisioning server 116 network address and one or more unique eSIM identifier values. In some embodiments, the MNO provisioning server 116 network address included in the MDM command received from the MDM server 502 is identical to the MNO provisioning server 116 network address included in the push notification message (and/or in the list of pending profiles/eSIMs 208 obtained from the lookup server 1002). The wireless device 102 compares unique identifier values associated with the pending eSIMs 208, e.g., ICCID values, with identifier values, e.g., ICCID values, for eSIMs 208 installed on the wireless device 102. When an ICCID value for a pending eSIM 208 matches an ICCID value for an eSIM 208 already installed by the wireless device 102, a consent notification message can be suppressed. A user of the wireless device 102 can have previously provided a consent notification upon installation of an MDM profile for subsequent management of cellular service credentials, e.g., eSIMs 208, managed by the MDM system. A second consent notification is not required for installation of the eSIM 208 from the MNO SMDP+ 542 responsive to an MDM command from the MDM server 502. In addition, as installation of the eSIM 208 triggered by the MDM command from the MDM server 502 completed successfully, the eSIM 208 need not be re-installed based on the push notification trigger from the push notification server 1004.

Figure 10B:
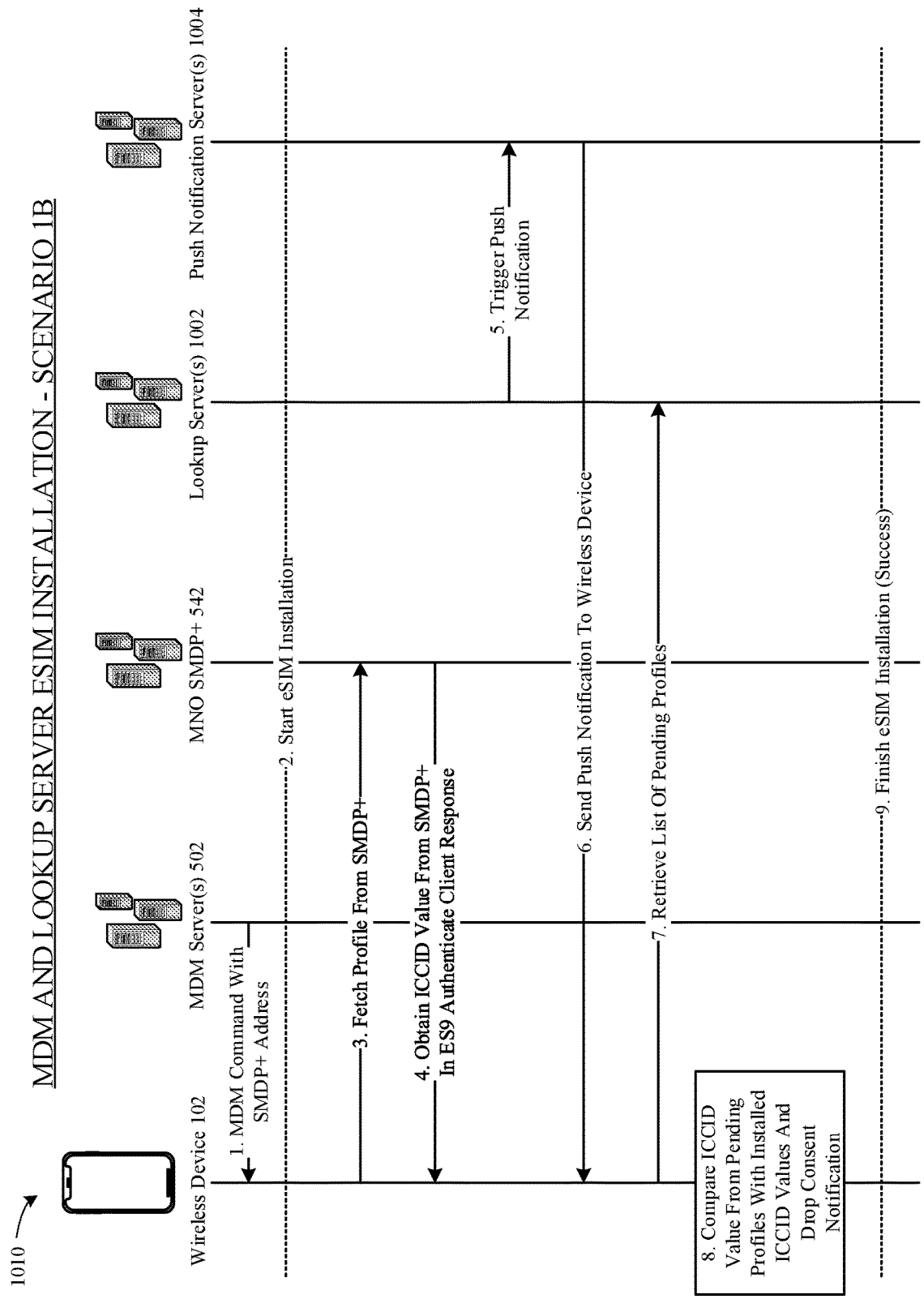

FIG. 10B illustrates a diagram 1010 of another exemplary message exchange sequence for managing an eSIM installation initiated by multiple network-based servers. In the example of FIG. 10B, a wireless device 102 receives a push notification from a second server, e.g., from a push notification server 1004, before completing installation of an eSIM 208 triggered by an MDM command received from a first server, e.g., from an MDM server 502.

An MDM server 502 sends an MDM command to the wireless device 102 with a network address, e.g., a URL value, for an MNO provisioning server 116, e.g., an MNO SMDP+ 542, to cause the wireless device 102 to initiate download and installation of an eSIM 208 from the MNO SMDP+ 542. The wireless device 102 retrieves the eSIM 208 from the MNO SMDP+ 542. The wireless device 102 obtains a unique identifier value, e.g., an integrated circuit card identifier (ICCID) value for the eSIM 208 from the MNO SMDP+ 542 in an ES9 authenticate client response message. Before completion of the installation of the eSIM 208 by the wireless device 102, a lookup server 1002 sends a message to a push notification server 1004 to trigger a push notification message to the wireless device 102. In the example illustrated in FIG. 10B, the push notification message from the push notification server 1004 is received at the wireless device 102 before successful completion of installation of the eSIM 208 triggered by the MDM command from the MNO SMDP+. Responsive to receipt of the push notification message from the push notification server 1004, the wireless device 102 retrieves from the lookup server 1002 a list of pending profiles, e.g., eSIMs 208, pending for the wireless device 102. In some embodiments, the push notification message from the push notification server 1004 and/or the list of pending profiles from the lookup server 1002 include an MNO provisioning server 116 network address and one or more unique eSIM identifier values. In some embodiments, the MNO provisioning server 116 network address included in the MDM command received from the MDM server 502 is identical to the MNO provisioning server 116 network address included in the push notification message (and/or in the list of pending profiles/eSIMs 208 obtained from the lookup server 1002). The wireless device 102 compares unique identifier values associated with the pending eSIMs 208, e.g., ICCID values, with identifier values, e.g., ICCID values, for eSIMs 208 installed (or being installed) on the wireless device 102. When an ICCID value for a pending eSIM 208 matches an ICCID value for an eSIM 208 already installed (or in the process of being installed) by the wireless device 102, a consent notification message can be suppressed. A user of the wireless device 102 can have previously provided a consent notification upon installation of an MDM profile for subsequent management of cellular service credentials, e.g., eSIMs 208, managed by the MDM system. A second consent notification is not required for installation of the eSIM 208 from the MNO SMDP+ 542 responsive to an MDM command from the MDM server 502. In addition, when installation of the eSIM 208 triggered by the MDM command from the MDM server 502 completes successfully, the eSIM 208 need not be re-installed based on the push notification trigger from the push notification server 1004.

Figure 10C:
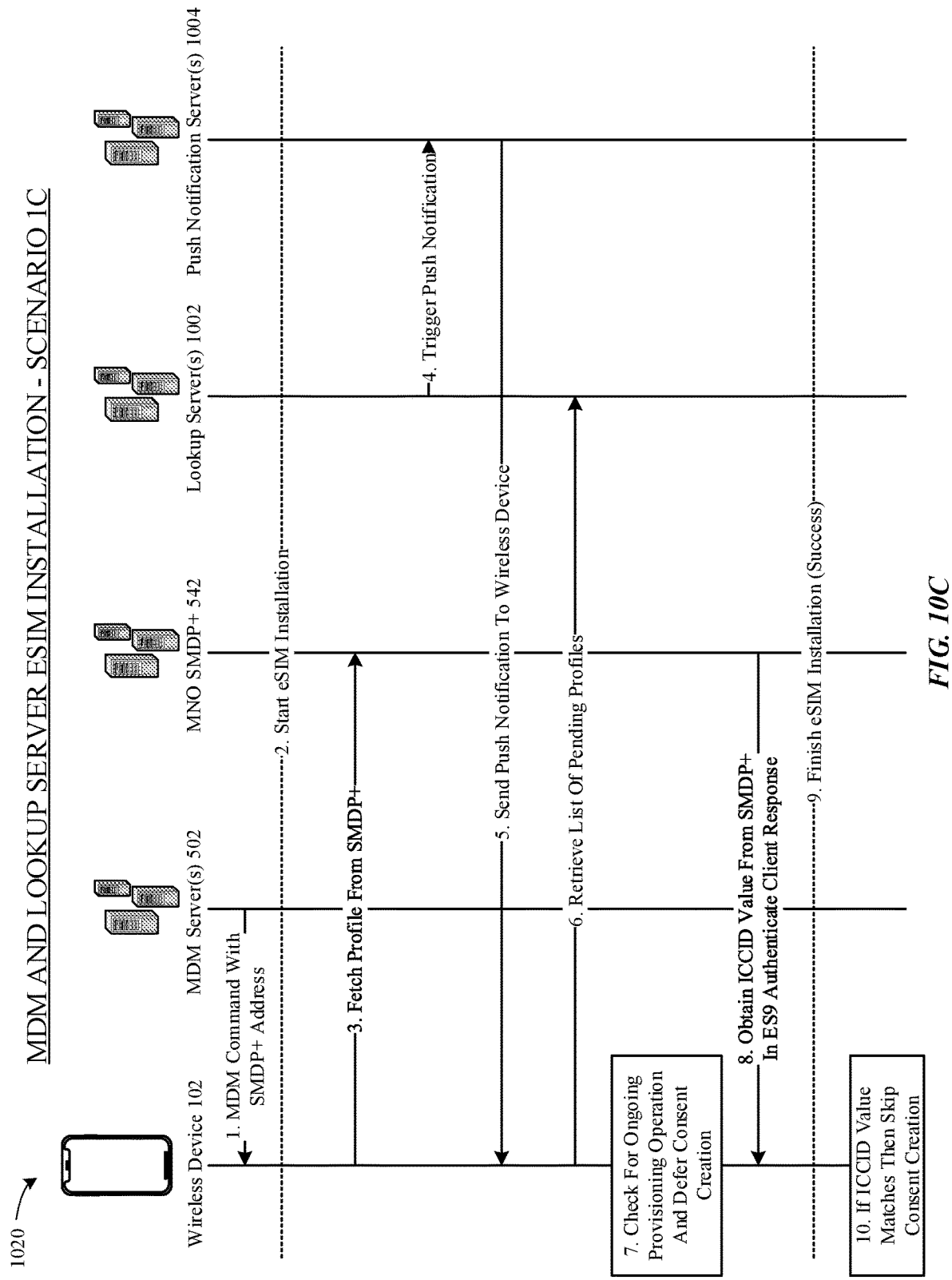

FIG. 10C illustrates a diagram 1020 of a further exemplary message exchange sequence for managing an eSIM installation initiated by multiple network-based servers. In the example of FIG. 10C, a wireless device 102 receives a push notification from a second server, e.g., from a push notification server 1004, before completing installation of an eSIM 208 triggered by an MDM command received from a first server, e.g., from an MDM server 502.

An MDM server 502 sends an MDM command to the wireless device 102 with a network address, e.g., a URL value, for an MNO provisioning server 116, e.g., an MNO SMDP+ 542, to cause the wireless device 102 to initiate downloading and installation of an eSIM 208 from the MNO SMDP+ 542. The wireless device 102 retrieves the eSIM 208 from the MNO SMDP+ 542. Before completion of the installation of the eSIM 208 by the wireless device 102, a lookup server 1002 sends a message to a push notification server 1004 to trigger a push notification message to the wireless device 102. In the example illustrated in FIG. 10C, the push notification message from the push notification server 1004 is received at the wireless device 102 before successful completion of installation of the eSIM 208 triggered by the MDM command from the MNO SMDP+ 542. Responsive to receipt of the push notification message from the push notification server 1004, the wireless device 102 retrieves from the lookup server 1002 a list of pending profiles, e.g., eSIMs 208, pending for the wireless device 102. The wireless device 102 checks whether there is an ongoing provisioning of an eSIM 208 to the wireless device 102, e.g., triggered by the MDM command from the MDM server 502, and when an eSIM 208 installation is determined to be in process, the wireless device 102 defers creation of a consent notification for one or more pending profiles, e.g., eSIMs 208, from the list of pending profiles obtained from the lookup server 1002. In some embodiments, the push notification message from the push notification server 1004 and/or the list of pending profiles from the lookup server 1002 include an MNO provisioning server 116 network address and one or more unique eSIM identifier values. In some embodiments, the MNO provisioning server 116 network address included in the MDM command received from the MDM server 502 is identical to the MNO provisioning server 116 network address included in the push notification message (and/or in the list of pending profiles/eSIMs 208 obtained from the lookup server 1002). The wireless device 102 obtains a unique identifier value, e.g., an integrated circuit card identifier (ICCID) value for the eSIM 208 being installed from the MNO SMDP+ 542 in an ES9 authenticate client response message. Subsequent to obtaining the ICCID value, installation of the eSIM 208 at the wireless device 102 completes successfully. After successful installation of the eSIM 208, the wireless device 102 compares unique identifier values associated with the pending eSIMs 208, e.g., ICCID values, from the lookup server 1002 with identifier values, e.g., ICCID values, for eSIMs 208 installed on the wireless device 102. When an ICCID value for a pending eSIM 208 matches an ICCID value for an eSIM 208 already installed by the wireless device 102, a consent notification message can be skipped. A user of the wireless device 102 can have previously provided a consent notification upon installation of an MDM profile for subsequent management of cellular service credentials, e.g., eSIMs 208, managed by the MDM system. A second consent notification is not required for installation of the eSIM 208 from the MNO SMDP+ 542 responsive to an MDM command from the MDM server 502. In addition, when installation of the eSIM 208 triggered by the MDM command from the MDM server 502 completes successfully, the eSIM 208 need not be re-installed based on the push notification trigger from the push notification server 1004.

Figure 11A:
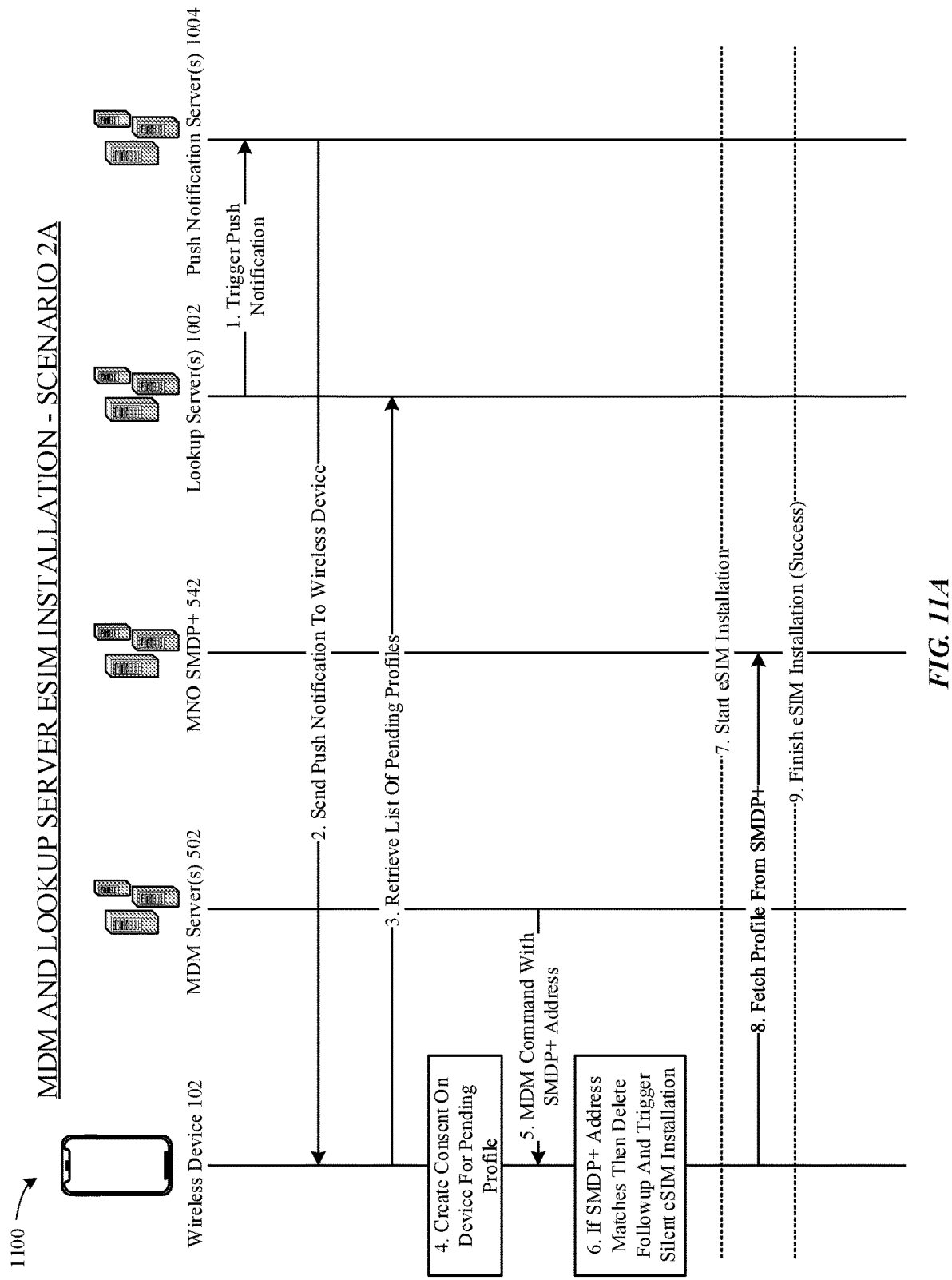
FIGS. 11A to 11C illustrate additional examples of managing eSIM installations initiated by multiple network-based servers, according to some embodiments.

FIG. 11A illustrates a diagram 1100 of an additional exemplary message exchange sequence for managing an eSIM installation initiated by multiple network-based servers. In the example of FIG. 11A, a wireless device 102 receives a push notification message from a first server, e.g., from a push notification server 1004, and from an MDM command from a second server, from an MDM server 502, before starting installation of an eSIM 208 triggered by the push notification message received from the first server, e.g., from the push notification server 1004.

A lookup server 1002 sends a message to a push notification server 1004 to trigger a push notification message to the wireless device 102. Responsive to receipt of the push notification message from the push notification server 1004, the wireless device 102 retrieves from the lookup server 1002 a list of pending profiles, e.g., eSIMs 208, pending for the wireless device 102. The wireless device 102 creates a consent notification for installation of the pending eSIM 208 based on the trigger from the push notification server 1004. After creation of the consent notification by the wireless device 102, an MDM server 502 sends an MDM command to the wireless device 102 with a network address, e.g., a URL value, for an MNO provisioning server 116, e.g., an MNO SMDP+ 542, to cause the wireless device 102 to initiate download and installation of an eSIM 208 from the MNO SMDP+ 542. In some embodiments, the push notification message from the push notification server 1004 and/or the list of pending profiles from the lookup server 1002 includes an MNO provisioning server 116 network address and one or more unique eSIM identifier values. In some embodiments, the MNO provisioning server 116 (MNO SMDP+ 542) network address included in the MDM command received from the MDM server 502 is identical to the MNO provisioning server 116 (MNO SMDP+ 542) network address included in the push notification message (and/or in the list of pending profiles/eSIMs 208 obtained from the lookup server 1002). When the network address for the MNO SMDP+ 542 servers match, the wireless device 102 deletes follow up for consent notification for installation of the eSIM 208 and triggers a silent installation of the eSIM 208 (e.g., via a background process). A user of the wireless device 102 can have previously provided a consent notification upon installation of an MDM profile for subsequent management of cellular service credentials, e.g., eSIMs 208, managed by the MDM system. A second consent notification is not required for installation of the eSIM 208 from the MNO SMDP+ 542 responsive to an MDM command from the MDM server 502. The consent created as a result of the push notification message triggered eSIM 208 installation can be discarded, as the MDM command for installation of the same eSIM 208 from the same MNO SMDP+ 542 server supersedes. The wireless device 102 retrieves the pending eSIM 208 from the MNO SMDP+ 542 server and successfully completes installation of the eSIM 208.

Figure 11B:
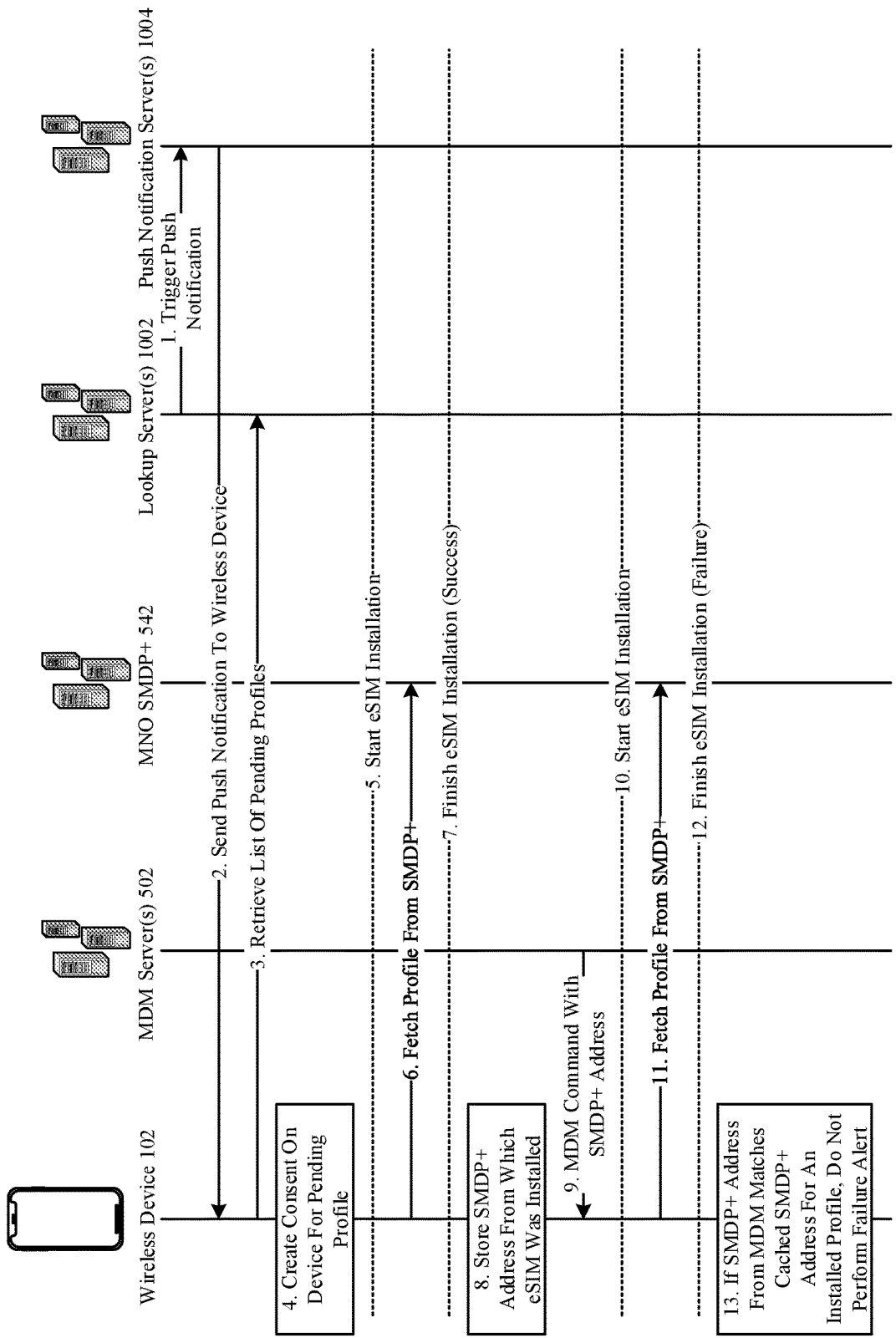

FIG. 11B illustrates a diagram 1110 of another exemplary message exchange sequence for managing an eSIM installation initiated by multiple network-based servers. In the example of FIG. 11B, a wireless device 102 receives a push notification message from a first server, e.g., from a push notification server 1004, which triggers successful installation of an eSIM 208, and subsequently, after installation of the eSIM 208 triggered by the push notification message received from the first server, e.g., from the push notification server 1004, receives an MDM command from a second server, e.g., from an MDM server 502, to install the same eSIM 208, which results in an eSIM installation failure.

A lookup server 1002 sends a message to a push notification server 1004 to trigger a push notification message to the wireless device 102. Responsive to receipt of the push notification message from the push notification server 1004, the wireless device 102 retrieves from the lookup server 1002 a list of pending profiles, e.g., eSIMs 208, pending for the wireless device 102. The wireless device 102 creates a consent notification for installation of the pending eSIM 208 based on the trigger from the push notification server 1004. The wireless device 102 initiates installation of the pending eSIM 208 by retrieving the pending eSIM 208 from an MNO provisioning server 116, e.g., the MNO SMDP+ 542 server, and successfully completes installation of the eSIM 208 from the MNO SMDP+ 542 server. The wireless device 102 stores the network address, e.g., URL value, of the SMDP+ 542 server from which the eSIM 208 was installed. After successful installation of the eSIM 208 at the wireless device 102, an MDM server 502 sends an MDM command to the wireless device 102 with a network address, e.g., a URL value, for an MNO provisioning server 116, e.g., an MNO SMDP+ 542, to cause the wireless device 102 to initiate download and installation of an eSIM 208 from the MNO SMDP+ 542. In some embodiments, the push notification message from the push notification server 1004 and/or the list of pending profiles from the lookup server 1002 include an MNO provisioning server 116 network address and one or more unique eSIM identifier values. In some embodiments, the MNO provisioning server 116 (MNO SMDP+ 542) network address included in the MDM command received from the MDM server 502 is identical to the MNO provisioning server 116 (MNO SMDP+ 542) network address included in the push notification message (and/or in the list of pending profiles/eSIMs 208 obtained from the lookup server 1002). The wireless device 102 initiates installation of the eSIM 208 based on the MDM command by attempting to retrieve the eSIM 208 from the SMDP+ 542 server indicated in the MDM command received from the MDM server 502. As the pending eSIM 208 has already been installed at the wireless device 102, the eSIM 208 is no longer available for download to the wireless device 102, and the eSIM 208 installation results in a failure indication (profile unavailable) from the MNO SMDP+ 542 server. The wireless device 102 checks the network address of the SMDP+ 542 server indicated in the MDM command received from the MDM server 502 with the previously cached network address from which the eSIM 208 was downloaded and installed as a result of the push notification message. When the cached SMDP+ 542 server network address matches the network address of the SMDP+ 542 server indicated in the MDM command from the MDM server 502, the wireless device 102 refrains from presenting a failure alert notification message for the eSIM 208 installation failure, as the eSIM 208 was successfully installed earlier.

Figure 11C:
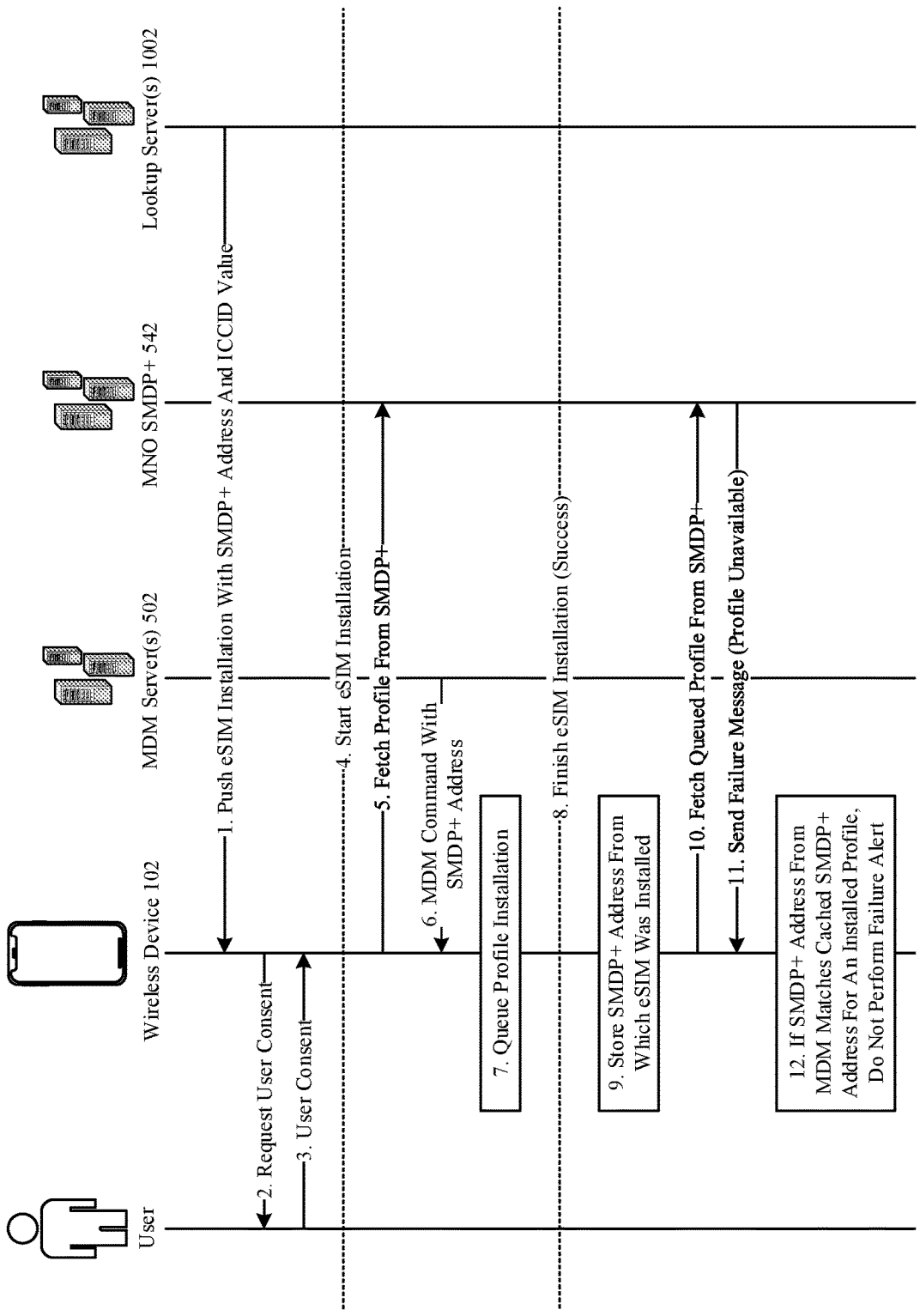

FIG. 11C illustrates a diagram 1120 of a further exemplary message exchange sequence for managing an eSIM installation initiated by multiple network-based servers. In the example of FIG. 11C, a wireless device 102 receives a push notification message from a first server, e.g., from a push notification server 1004, which triggers successful installation of a first eSIM 208. During installation of the eSIM 208 triggered by the push notification message received from the first server, e.g., from the push notification server 1004, the wireless device 102 receives an MDM command from a second server, e.g., from an MDM server 502, to install a second eSIM 208. When the first and second eSIMs 208 are identical, an attempt to install the second eSIM 208 results in an eSIM installation failure.

A lookup server 1002 triggers a push notification message to the wireless device 102, the push notification message including i) a network address for an MNO SMDP+ 542 server from which to download an eSIM 208 for the wireless device 102, and ii) a unique identifier value, e.g., an ICCID value, associated with the eSIM 208 to be downloaded to and installed on the wireless device 102. The wireless device 102 requests and receives consent from the user for installation of the eSIM 208. After receipt of user consent, the wireless device 102 initiates eSIM 208 installation by retrieving the eSIM 208 from the MNO SMDP+ 542 server. After initiating eSIM 208 installation and before completing eSIM 208 installation, the wireless device 102 receives from an MDM server 502 an MDM command that includes a network address, e.g., a URL value, for an MNO provisioning server 116, e.g., an MNO SMDP+ 542 server, to cause the wireless device 102 to install an eSIM 208. The wireless device 102 queues information, e.g. relevant parameters for installation of the eSIM 208, and delays installation of the eSIM 208 based on the MDM command until the previously started, ongoing eSIM 208 installation completes. After the eSIM 208 installation successfully completes, the wireless device 102 stores the network address, e.g., URL value, for the MNO SMDP+ 542 server from which the eSIM 208 was downloaded and installed. Subsequently, the wireless device 102 queries the MNO SMDP+ 542 server for the pending eSIM 208 indicated by the MDM command previously received from the MDM server 502. The MNO SMDP+ 542 server sends to the wireless device 102 a message with a failure indication, as the eSIM 208 was already downloaded and installed by the wireless device 102 previously. When the network address of the SMDP+ 542 server indicated by the MDM command from the MDM server 502 matches the cached network address of the SMDP+ 542 server from which the eSIM 208 was installed successfully, the wireless device 102 refrains from providing a failure notification alert message.

Figure 12:
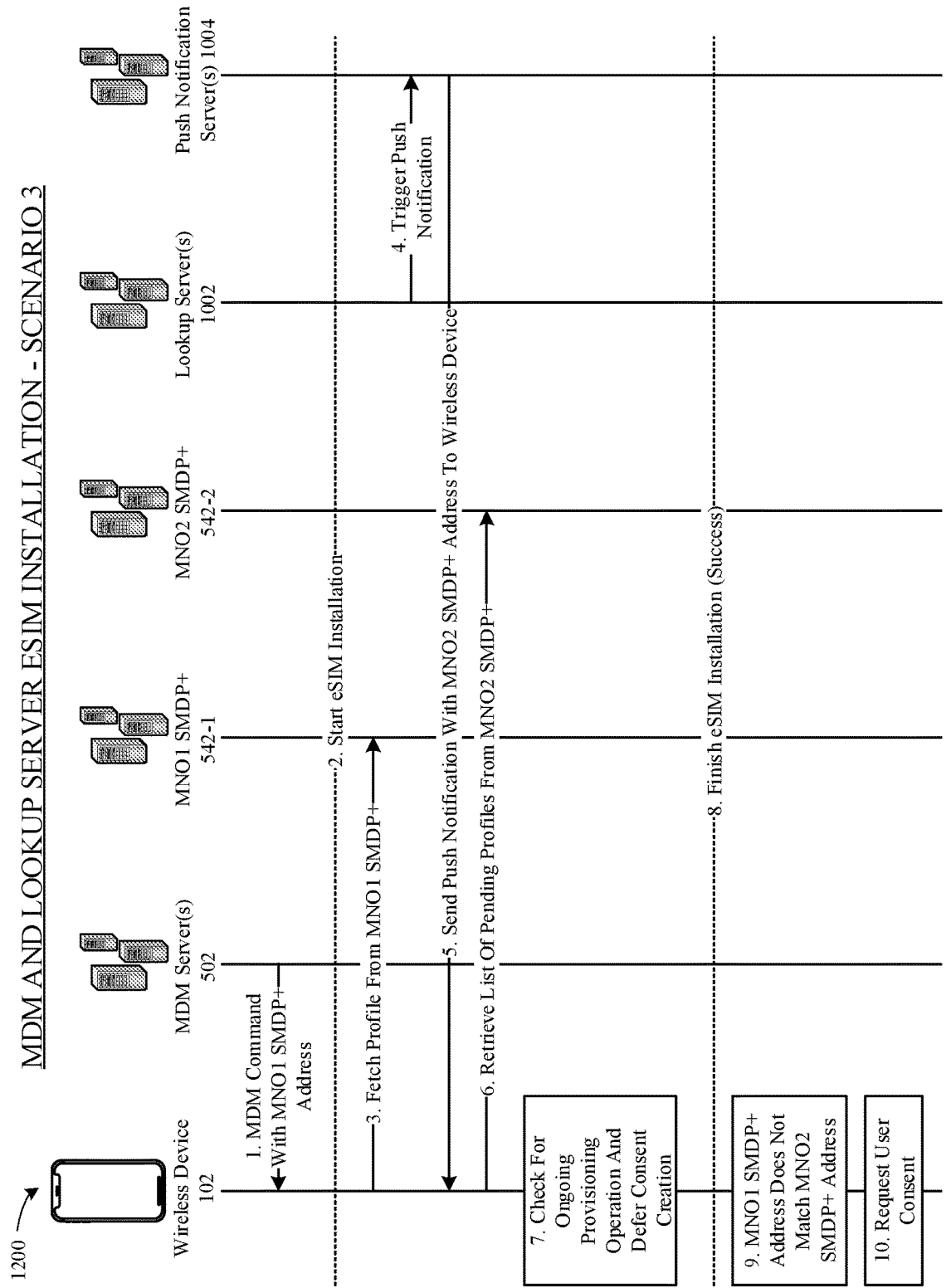
FIGS. 12 and 13 illustrate further examples of managing eSIM installations initiated by multiple network-based servers, according to some embodiments.

FIG. 12 illustrates a diagram 1200 of an exemplary message exchange sequence for managing eSIM installations from multiple, distinct MNO provisioning servers 116. In the example of FIG. 12, the wireless device receives an MDM command from an MDM server 502 to install a first eSIM 208 for a first MNO 114, e.g., MNO1, and subsequently receives a push notification message from a push notification server 1004 to install a second eSIM 208 for a second MNO 114, e.g., MNO2. The push notification message for the second eSIM 208 is received by the wireless device 102 after installation of the first eSIM 208 starts and before installation of the first eSIM 208 completes.

An MDM server 502 sends an MDM command to the wireless device 102 with a network address, e.g., a URL value, for a first MNO provisioning server 116, e.g., a first MNO SMDP+ 542-1, to cause the wireless device 102 to initiate downloading and installation of a first eSIM 208 from the first MNO SMDP+ 542-1. The wireless device 102 retrieves the first eSIM 208 from the first MNO SMDP+ 542-1. Before completion of the installation of the first eSIM 208 by the wireless device 102, a lookup server 1002 sends a message to a push notification server 1004 to trigger a push notification message to the wireless device 102. In the example illustrated in FIG. 12, the push notification message from the push notification server 1004 is received at the wireless device 102 before successful completion of installation of the first eSIM 208 triggered by the MDM command from the first MNO SMDP+ 542-1. The push notification message includes a network address for a second MNO provisioning server 116, e.g., a second MNO SMDP+ 542-2, from which the wireless device 102 is to initiate downloading and installation of a second eSIM 208. The wireless device 102 retrieves from the second MNO SMDP+ 542-2 a list of pending eSIMs 208 ready for downloading to and installation on the wireless device 102. After retrieval of the list, and before completion of the installation of the first eSIM 208, the wireless device 102 checks for ongoing, in process eSIM 208 installations, and when there is an ongoing eSIM 208 installation, the wireless device 102 defers creating a consent notification for the push notification message from the push notification server 1004. After successful completion of installation of the first eSIM 208, the wireless device 102 checks whether the network address of the first MNO SMDP+ 542-1 received in the MDM command matches the network address of the second MNO SMDP+ 542-2 indicated in the push notification message (and from which the list of pending eSIMs 208 was retrieved as a result of the push notification message). When the two network address of the two MNO SMDP+ servers 542-1 and 542-2 do not match, the wireless device 102 requests user consent for installation of the second eSIM 208 from the second MNO SMDP+ 542-2 server.

Figure 13:
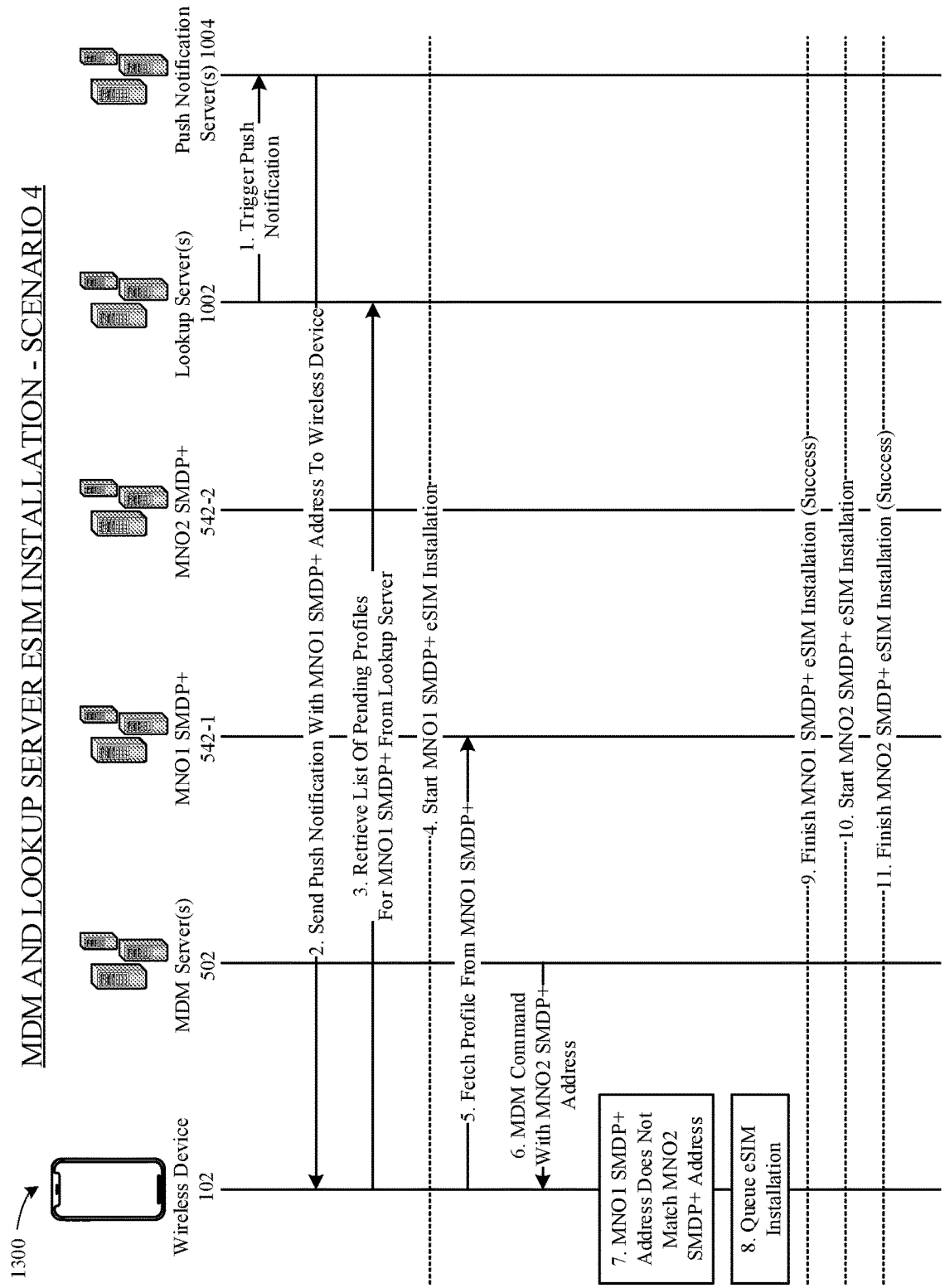

FIG. 13 illustrates a diagram 1300 of a further exemplary message exchange sequence for managing eSIM installations from multiple, distinct MNO provisioning servers 116. In the example of FIG. 13, the wireless device receives a push notification message from a push notification server 1104 to install a first eSIM 208 for a first MNO 114, e.g., MNO1, and subsequently receives an MDM command from an MDM server 502 to install a second eSIM 208 for a second MNO 114, e.g., MNO2. The MDM command for the second eSIM 208 is received by the wireless device 102 after installation of the first eSIM 208 starts and before installation of the first eSIM 208 completes.

A lookup server 1002 sends a message to a push notification server 1004 to trigger a push notification message to the wireless device 102, the push notification message including a network address for a first MNO provisioning server 116, e.g., a first MNO SMDP+ 542-1 server, from which to obtain one or more eSIMs 208. Responsive to receipt of the push notification message from the push notification server 1004, the wireless device 102 retrieves from the lookup server 1002 a list of pending profiles, e.g., eSIMs 208, pending for downloading to and installation at the wireless device 102. The wireless device 102 initiates installation of a first eSIM 208 from the first MNO SMDP+ 542-1 server. Subsequent to initiation of the installation of the first eSIM 208, the wireless device 102 receives from an MDM server 502 an MDM command that includes a network address for a second MNO provisioning server 116, e.g., for a second MNO SMDP+ 542-2 server, to cause the wireless device 102 to download and install a second eSIM 208 from the second MNO SMDP+ 542-2. The wireless device 102 checks the network addresses of the two MNO SMDP+ servers 542-1 and 542-2, and when the network address of the first MNO SMDP+ 542-1 server does not match the network address of the second MNO SMDP+ 542-2 server, the wireless device 102 concludes that two distinct eSIMs 208 are to be installed. The wireless device 102 queues information, e.g., parameters, for installation of the second eSIM 208, and waits for successful completion of installation of the first eSIM 208 from the first MNO SMDP+ 542-1 server before initiating and completing successfully installation of the second eSIM 208 from the second SMDP+ 542-2 server.

Figure 14:
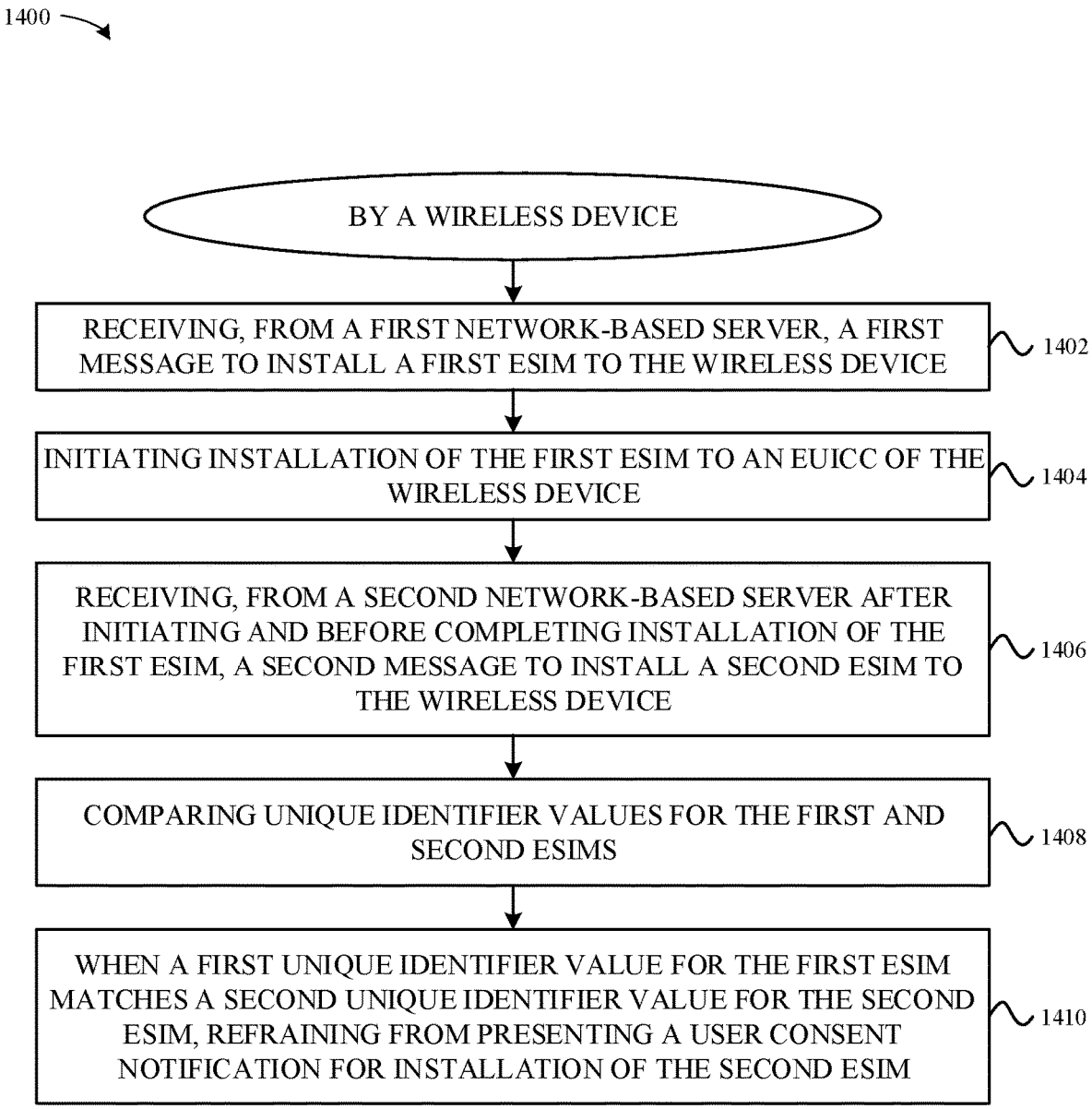
FIGS. 14 to 19 illustrate exemplary methods for managing eSIM installations initiated by multiple network-based servers, according to some embodiments.

FIG. 14 illustrates a flowchart 1400 of an exemplary method for managing eSIM 208 installation by a wireless device 102. At 1402, the wireless device 102 receives, from a first network-based server, a first message to install a first eSIM 208 to the wireless device 102. At 1404, the wireless device 102 initiates installation of the first eSIM 208 to an eUICC 108 of the wireless device 102. At 1406, the wireless device 102 receives, from a second network-based server after initiating and before completing installation of the first eSIM 208, a second message to install a second eSIM 208 to the wireless device 102. At 1408, the wireless device 102 compares unique identifier values for the first and second eSIMs 208. At 1410, when a first unique identifier value for the first eSIM 208 matches a second unique identifier value for the second eSIM 208, the wireless device 102 refrains from presenting a user consent notification for installation of the second eSIM 208.

In some embodiments, the unique identifier values for the first and second eSIMs 208 includes integrated circuit card identifier (ICCID) values for each eSIM 208. In some embodiments, the ICCID value for the first eSIM 208 is identical to the ICCID value for the second eSIM 208. In some embodiments, comparison of the unique identifier values for the first and second eSIMs 208 occurs after successful installation of the first eSIM 208 on the eUICC 108 of the wireless device 102. In some embodiments, comparison of the unique identifier values for the first and second eSIMs 208 occurs before successful installation of the first eSIM 208 on the eUICC 108 of the wireless device 102. In some embodiments, the first network-based server includes a mobile device management (MDM) server 502, and the first message includes an MDM command that includes a first network address for a first provisioning server 116 from which to download the first eSIM 208. In some embodiments, the MDM server 502 is managed by a business enterprise with which the wireless device 102 is associated. In some embodiments, the second network-based server includes a push notification server 1004, and the second message includes an push notification that includes a second network address for a second provisioning server 116 from which to download the second eSIM 208. In some embodiments, the push notification server 1004 is managed by an original equipment manufacturer (OEM) of the wireless device 102 or third party affiliated therewith. In some embodiments, the first network address and the second network address are identical. In some embodiments, the method further includes the wireless device 102 retrieving, from the second network-based server responsive to receipt of the second message, a list of one or more pending eSIMs 208 available for download to and installation on the wireless device 102. In some embodiments the list of one or more pending eSIMs 208 includes the second eSIM 208 and the second unique identifier value for the second eSIM 208. In some embodiments, the method further includes the wireless device 102 obtaining, from the first network-based server, the first unique identifier value for the first eSIM 208 in a client authentication response. In some embodiments, the method further includes the wireless device 102 i) determining installation of the first eSIM is ongoing after receipt of the second message, and ii) deferring creation of the user consent notification until after completing installation of the first eSIM 208.

Figure 15:
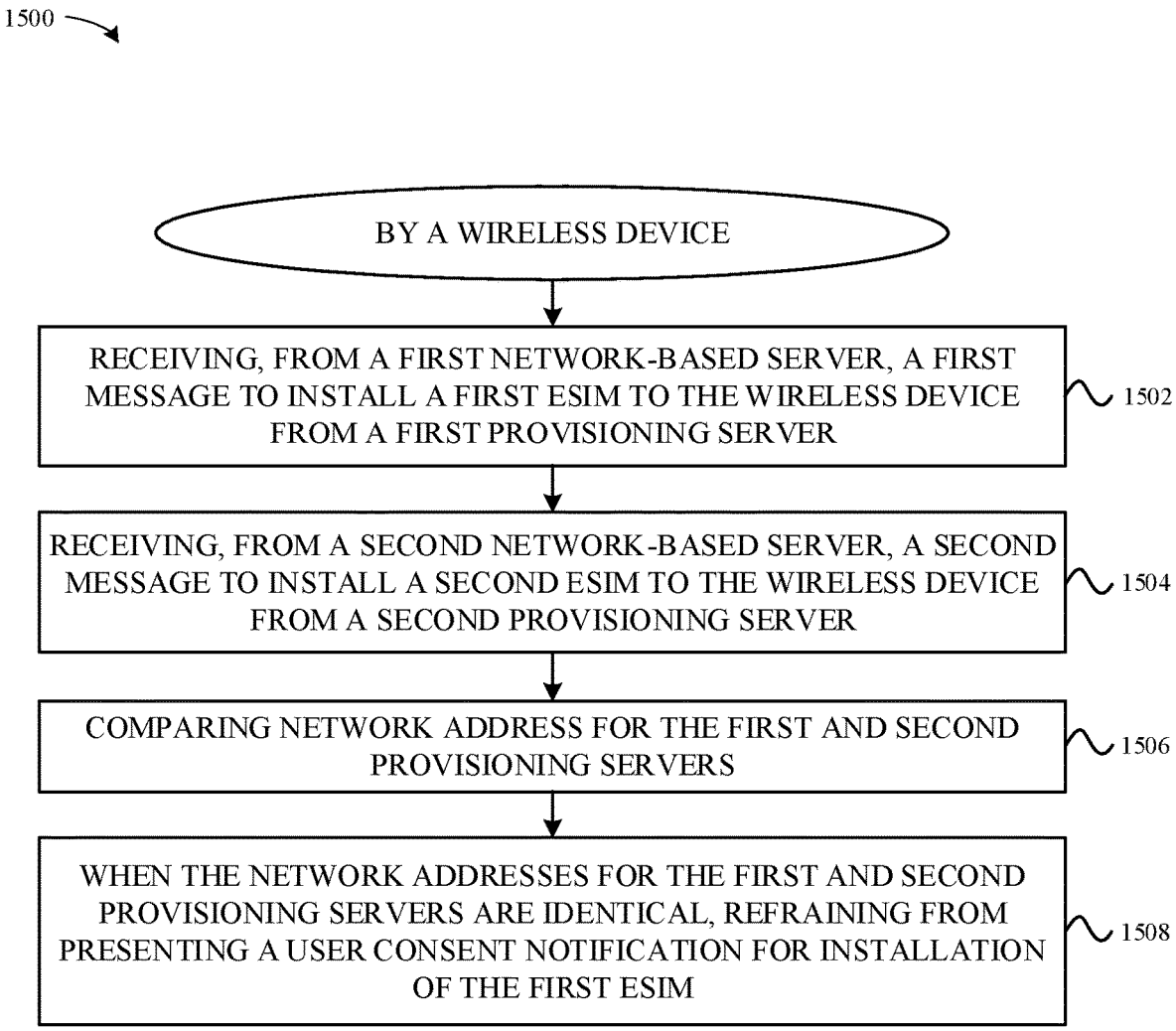

FIG. 15 illustrates a flowchart 1500 of another exemplary method for managing eSIM 208 installation by a wireless device 102. At 1502, the wireless device 102 receives, from a first network-based server, a first message to install a first eSIM 208 to the wireless device 102 from a first provisioning server 116. At 1502, the wireless device 102 receives, from a first network-based server, a first message to install a first eSIM 208 to the wireless device 102 from a first provisioning server 116. At 1504, the wireless device 102 receives, from a second network-based server, a second message to install a second eSIM 208 to the wireless device 102 from a second provisioning server 116. At 1506, the wireless device 102 compares network addresses for the first and second provisioning servers 116. At 1508, when the network addresses for the first and second provisioning servers 116 are identical, the wireless device 102 refrains from presenting a user consent notification for installation of the first eSIM 208.

In some embodiments, the method further includes the wireless device 102 installing the first eSIM 208 from the first provisioning server 116 using a background process without alerting a user of the wireless device 102. In some embodiments, the method further includes the wireless device 102: i) creating the consent notification for installation of the first eSIM 208 before receiving the second message to install the second eSIM 208; and ii) deleting the consent notification when the network addresses for the first and second provisioning servers 116 are identical.

Figure 16:
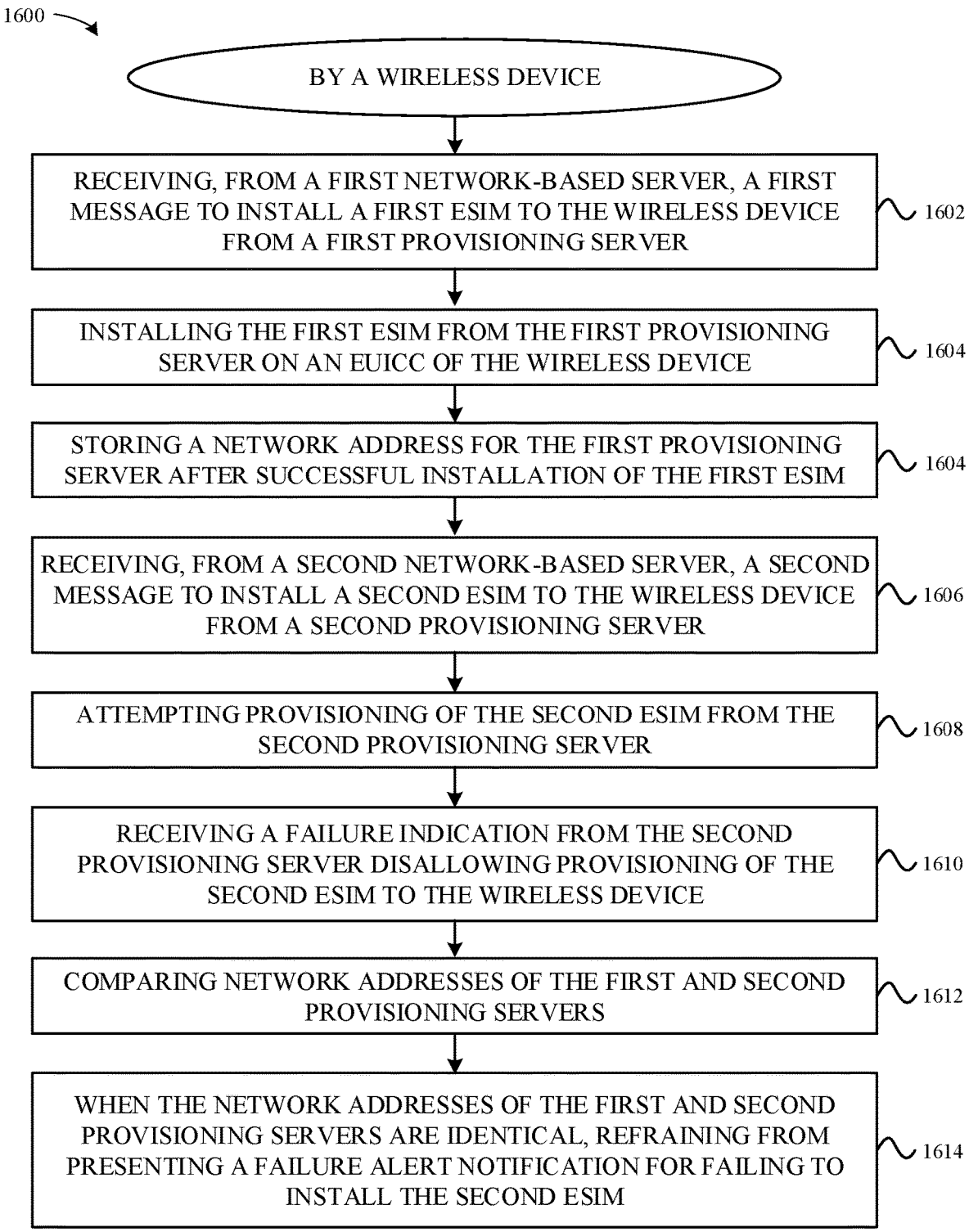

FIG. 16 illustrates a flowchart 1600 of a further exemplary method for managing eSIM 208 installation by a wireless device 102. At 1602, the wireless device 102 receives, from a first network-based server, a first message to install a first eSIM 208 to the wireless device 102 from a first provisioning server 116. At 1604, the wireless device 102 installs the first eSIM 208 from the first provisioning server 116 on an eUICC 108 of the wireless device 102. It 1606, the wireless device 102 stores a network address for the first provisioning server 116 after successful installation of the first eSIM 208. At 1606, the wireless device 102 receives, from a second network-based server, a second message to install a second eSIM 208 to the wireless device 102 from a second provisioning server 116. At 1608, the wireless device 102 attempts to provision the second eSIM 208 from the second provisioning server 116. At 1610, the wireless device 102 receives a failure indication from the second provisioning server 116 disallowing provisioning of the second eSIM 208 to the wireless device 102. At 1612, the wireless device 102 compares network addresses of the first and second provisioning servers 116. At 1614, when the network addresses of the first and second provisioning servers are identical, the wireless device 102 refrains from presenting a failure alert notification for failing to install the second eSIM 208.

In some embodiments, the method further includes the wireless device 102: i) presenting a consent notification for installation of the first eSIM 208 to a user of the wireless device 102 after receipt of the first message to install the first eSIM 208; and ii) performing installation of the first eSIM 208 only after receiving consent from the user of the wireless device 102.

Figure 17A:
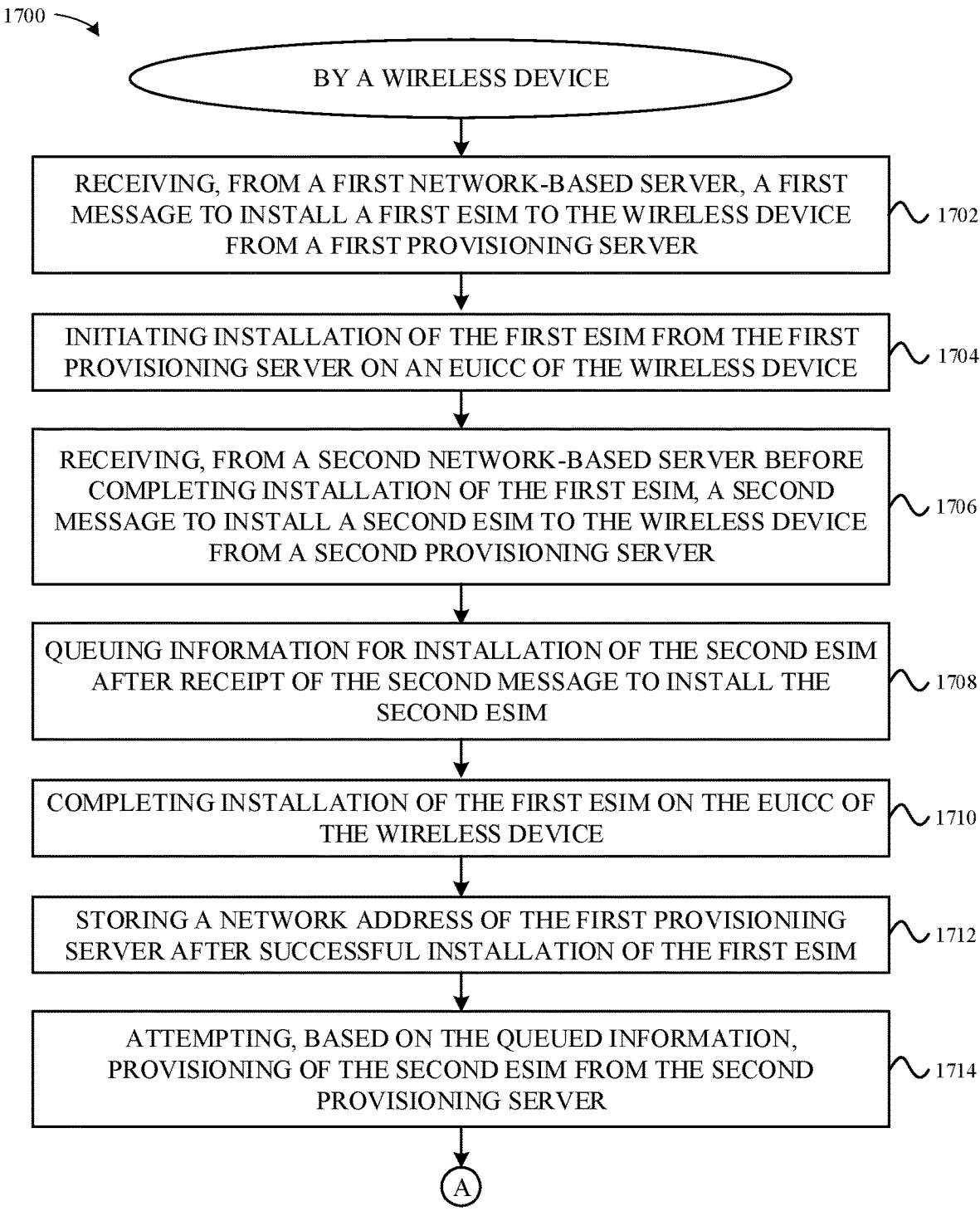
Figure 17B:
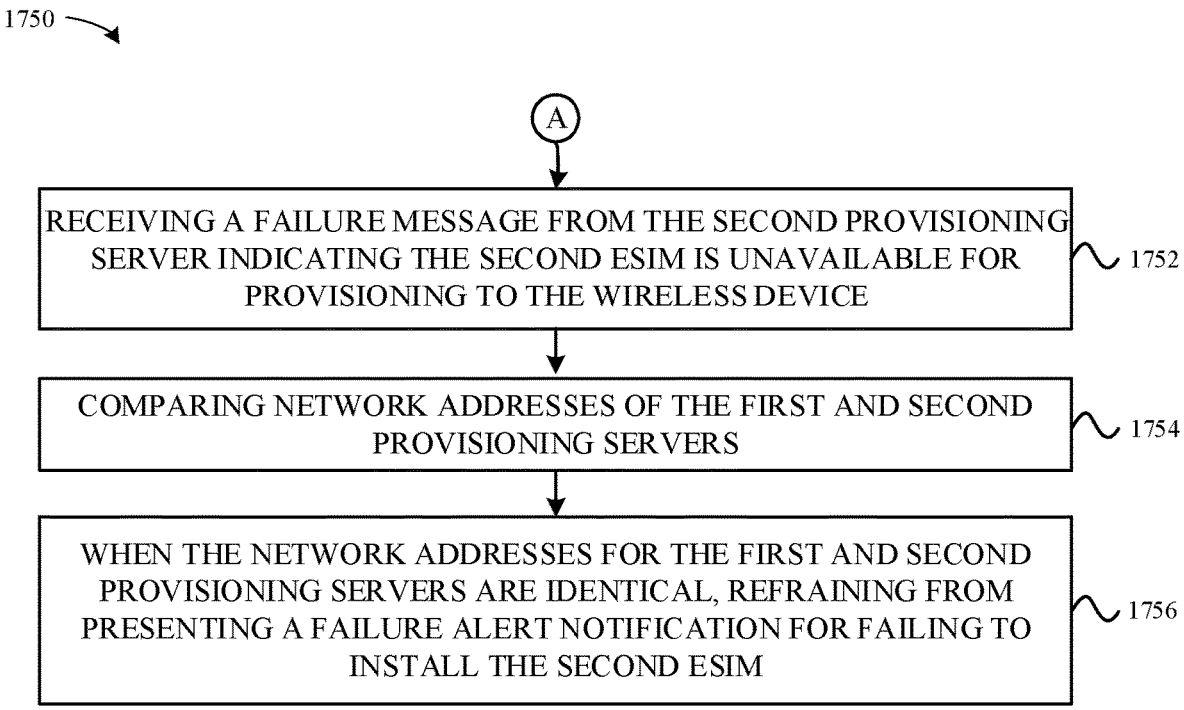

FIGS. 17A and 17B illustrate flowcharts 1700, 1750 of another exemplary method for managing eSIM 208 installation by a wireless device 102. At 1702, the wireless device 102 receives, from a first network-based server, a first message to install a first eSIM 208 to the wireless device 102 from a first provisioning server 116. At 1704, the wireless device 102 initiates installation of the first eSIM 208 from the first provisioning server 116 on an eUICC 108 of the wireless device 102. At 1706, the wireless device 102 receives, from a second network-based server before completing installation of the first eSIM 208, a second message to install a second eSIM 208 to the wireless device 102 from a second provisioning server 116. At 1708, the wireless device 102 queues information for installation of the second eSIM 208 after receipt of the second message to install the second eSIM 208. At 1710, the wireless device 102 completes installation of the first eSIM 208 on the eUICC 108 of the wireless device 102. At 1712, the wireless device 102 stores a network address of the first provisioning server 116 after successful installation of the first eSIM 208. At 1714, the wireless device 102 attempts, based on the queued information, to provision the second eSIM 208 from the second provisioning server 116. At 1752, the wireless device 102 receives a failure message from the second provisioning server 116 indicating the second eSIM 208 is unavailable for provisioning to the wireless device 102. At 1754, the wireless device compares network addresses of the first and second provisioning servers 116. At 1756, when the network addresses for the first and second provisioning servers 116 are identical, the wireless device 102 refrains from presenting a failure alert notification for failing to install the second eSIM 208.

Figure 18:
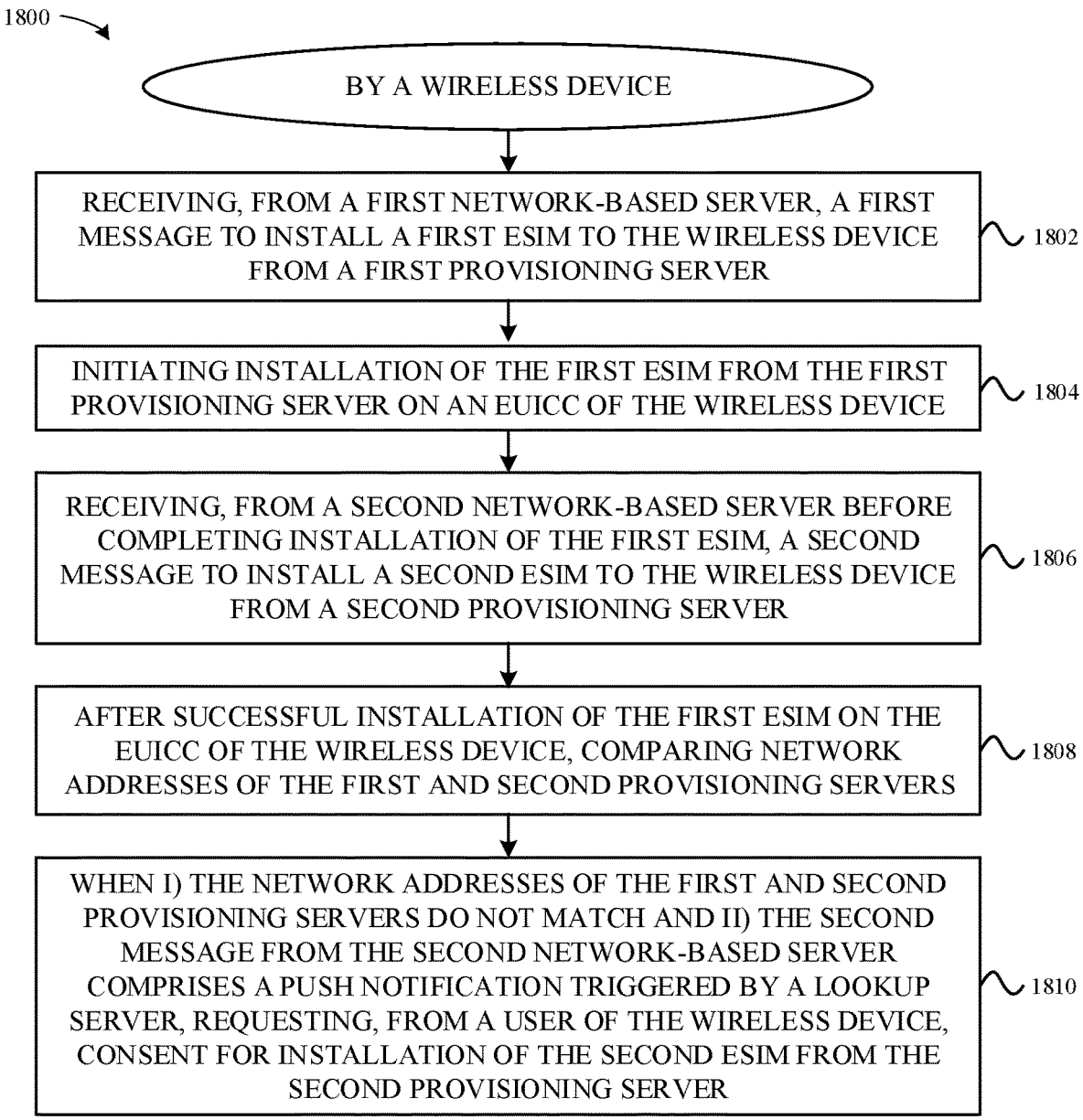

FIG. 18 illustrates a flowchart 1800 of a further method for managing eSIM 208 installation by a wireless device 102. At 1802, the wireless device 102 receives, from a first network-based server, a first message to install a first eSIM 208 to the wireless device 102 from a first provisioning server 116. At 1804, the wireless device 102 initiates installation of the first eSIM 208 from the first provisioning server 116 on an eUICC 108 of the wireless device 102. At 1806, the wireless device 102 receives, from a second network-based server before completing installation of the first eSIM 208, a second message to install a second eSIM 208 to the wireless device 102 from a second provisioning server 116. At 1808, after successful installation of the first eSIM 208 on the eUICC 108 of the wireless device 102, the wireless device 102 compares network addresses of the first and second provisioning servers 116. At 1810, when i) the network address of the first and second provisioning servers 116 do not match, and ii) the second message from the second network-based server includes a push notification triggered by a lookup server 1002, the wireless device 102 requests, from a user of the wireless device 102, consent for installation of the second eSIM 208 from the second provisioning server 116.

In some embodiments, the method further includes the wireless device 102: i) determining installation of the first eSIM 208 is ongoing after receipt of the second message to install the second eSIM 208, and ii) deferring creation of a user consent notification for installation of the second eSIM 208.

Figure 19:
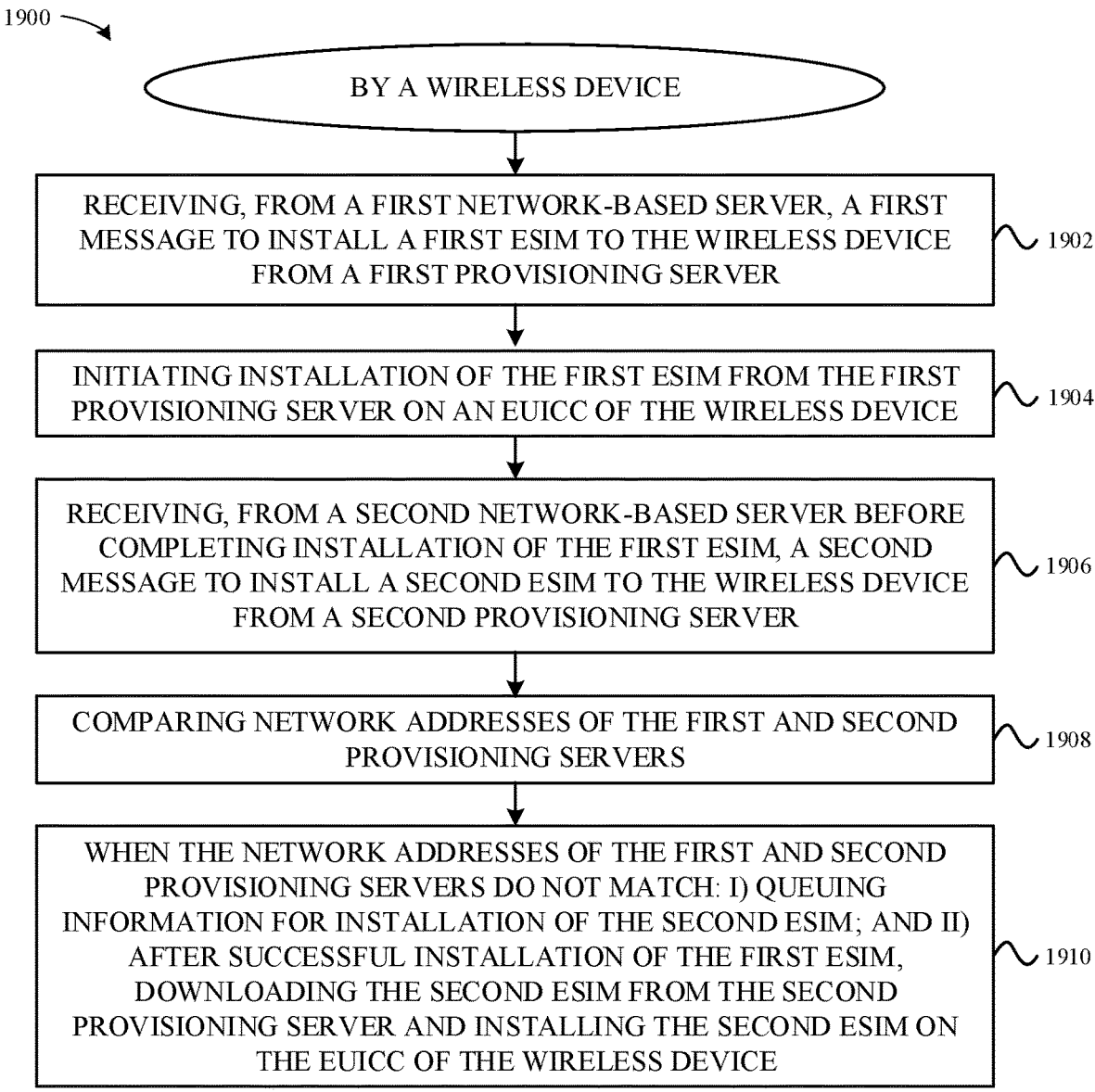

FIG. 19 illustrates a flowchart 1900 of an additional method for managing eSIM 208 installation by a wireless device 102. At 1902, the wireless device 102 receives, from a first network-based server, a first message to install a first eSIM 208 to the wireless device 102 from a first provisioning server 116. At 1904, the wireless device 102 initiates installation of the first eSIM 208 from the first provisioning server 116 on an eUICC 108 of the wireless device 102. At 1906, the wireless device 102 receives, from a second network-based server before completing installation of the first eSIM 208, a second message to install a second eSIM 208 to the wireless device 102 from a second provisioning server 116. At 1908, the wireless device 102 compares network addresses of the first and second provisioning servers 116. At 1910, when the network addresses of the first and second provisioning servers 116 do not match, the wireless device 102: i) queues information for installation of the second eSIM 208, and ii) after successful installation of the first eSIM 208, downloads the second eSIM 208 from the second provisioning server 116 and installs the second eSIM 208 on the eUICC 108 of the wireless device 102.

In some embodiments, the first message includes a push notification received from a push notification server 1004 and triggered by a lookup server 1002, and the second message includes a mobile device management (MDM) command from an MDM server 502. In some embodiments, the lookup server 1002 is managed by an original equipment manufacturer (OEM) of the wireless device 102 or a third party affiliated therewith, and the MDM server 502 is managed by a business enterprise with which the wireless device 102 is associated.

Figure 20:
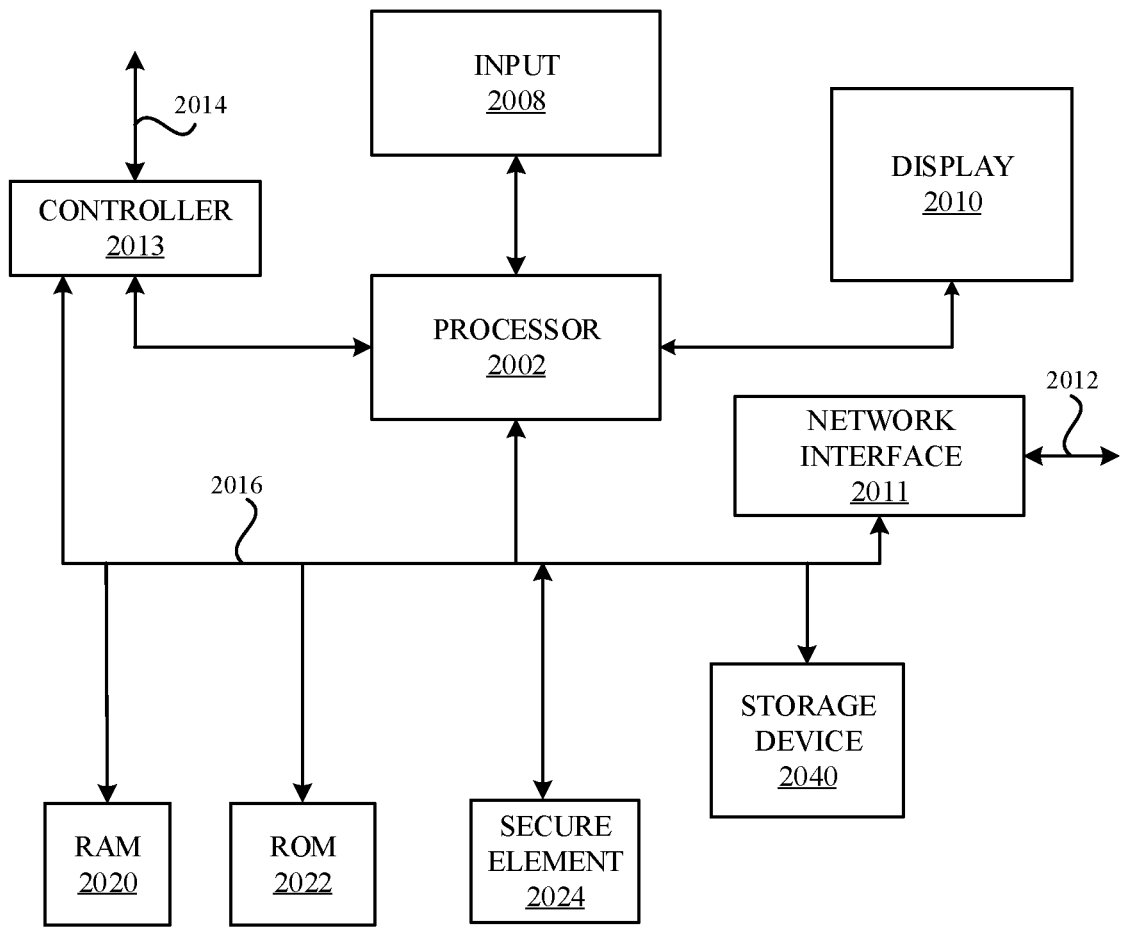
FIG. 20 illustrates a block diagram of exemplary elements of a mobile wireless device, according to some embodiments.

FIG. 20 illustrates a detailed view of a representative computing device 2000 that can be used to implement various methods described herein, according to some embodiments. In particular, the detailed view illustrates various components that can be included in the mobile wireless device 102. As shown in FIG. 20, the computing device 2000 can include a processor 2002 that represents a microprocessor or controller for controlling the overall operation of computing device 2000. The computing device 2000 can also include a user input device 2008 that allows a user of the computing device 2000 to interact with the computing device 2000. For example, the user input device 2008 can take a variety of forms, such as a button, keypad, dial, touch screen, audio input interface, visual/image capture input interface, input in the form of sensor data, etc. Still further, the computing device 2000 can include a display 2010 that can be controlled by the processor 2002 to display information to the user. A data bus 2016 can facilitate data transfer between at least a storage device 2040, the processor 2002, and a controller 2013. The controller 2013 can be used to interface with and control different equipment through an equipment control bus 2014. The computing device 2000 can also include a network/bus interface 2011 that communicatively couples to a data link 2012. In the case of a wireless connection, the network/bus interface 2011 can include a wireless transceiver.

The computing device 2000 also includes a storage device 2040, which can comprise a single disk or a plurality of disks (e.g., hard drives), and includes a storage management module that manages one or more partitions within the storage device 2040. In some embodiments, storage device 2040 can include flash memory, semiconductor (solid state) memory or the like. The computing device 2000 can also include a Random Access Memory (RAM) 2020 and a Read-Only Memory (ROM) 2022. The ROM 2022 can store programs, utilities or processes to be executed in a non-volatile manner. The RAM 2020 can provide volatile data storage, and stores instructions related to the operation of the computing device 2000. The computing device 2000 further includes a secure element 2024, which can include an eUICC 108 on which to store one or more eSIMs 208 and/or a UICC 118 (physical SIM card).

Representative Embodiments

In some embodiments, a method for managing eSIM 208 installation by a wireless device 102 includes the wireless device 102: i) receiving, from a first network-based server, a first message to install a first eSIM 208 to the wireless device 102; ii) initiating installation of the first eSIM 208 to an eUICC 108 of the wireless device 102; iii) receiving, from a second network-based server after initiating and before completing provisioning of the first eSIM 208, a second message to install a second eSIM 208 to the wireless device 102; iv) comparing unique identifier values for the first and second eSIMs 208; and v) when a first unique identifier value for the first eSIM 208 matches a second unique identifier value for the second eSIM 208, refraining from presenting a user consent notification for installation of the second eSIM 208. In some embodiments, the unique identifier values for the first and second eSIMs 208 comprise ICCID values for each eSIM 208. In some embodiments, the ICCID value for the first eSIM 208 is identical to the ICCID value for the second eSIM 208. In some embodiments, comparing unique identifier values for the first and second eSIMs 208 occurs after successful installation of the first eSIM 208 on the eUICC 108 of the wireless device 102. In some embodiments, comparing unique identifier values for the first and second eSIMs 208 occurs before successful installation of the first eSIM 208 on the eUICC 103 of the wireless device 102. In some embodiments, the first network-based server includes a mobile device management (MDM) server 502, and the first message includes an MDM command that includes a first network address for a first provisioning server from which to download the first eSIM 208. In some embodiments, the MDM server 502 is managed by a business enterprise with which the wireless device 102 is associated. In some embodiments, the second network-based server includes a push notification server 1004, and the second message includes a push notification that includes a second network address for a second provisioning server from which to download the second eSIM 208. In some embodiments, the push notification server 1004 is managed by an original equipment manufacturer (OEM) of the wireless device 102 or third party affiliated therewith. In some embodiments, the first network address and the second network address are identical. In some embodiments, the method further includes the wireless device 102 retrieving, from the second network-based server responsive to receipt of the second message, a list of one or more pending eSIMs 208 available for download to and installation on the wireless device 102. In some embodiments, the list of one or more pending eSIMs 208 includes the second eSIM 208 and the second unique identifier value for the second eSIM 208. In some embodiments, the method further includes the wireless device 102 obtaining, from the first network-based server, the first unique identifier value for the first eSIM 208 in a client authentication response. In some embodiments, the method further includes the wireless device 102 i) determining installation of the first eSIM 208 is ongoing after receipt of the second message, and ii) deferring creation of the user consent notification until after completing installation of the first eSIM 208.

In some embodiments, a method for managing eSIM 208 installation by a wireless device 102 includes the wireless device 102: i) receiving, from a first network-based server, a first message to install a first eSIM 208 to the wireless device 102 from a first provisioning server; ii) receiving, from a second network-based server, a second message to install a second eSIM 208 to the wireless device 102 from a second provisioning server; iii) comparing network addresses for the first and second provisioning servers; and iv) when the network addresses for the first and second provisioning servers are identical, refraining from presenting a user consent notification for installation of the first eSIM 208. In some embodiments, the method further includes the wireless device 102 installing the first eSIM 208 from the first provisioning server using a background process without alerting a user of the wireless device 102. In some embodiments, the method further includes the wireless device 102: i) creating the consent notification for installation of the first eSIM 208 before receiving the second message to install the second eSIM 208, and ii) deleting the consent notification when the network addresses for the first and second provisioning servers are identical.

In some embodiments, a method for managing eSIM 208 installation by a wireless device 102 includes the wireless device 102: i) receiving, from a first network-based server, a first message to install a first eSIM 208 to the wireless device 102 from a first provisioning server; ii) installing the first eSIM 208 from the first provisioning server on an eUICC of the wireless device 102; iii) storing a network address for the first provisioning server after successful installation of the first eSIM 208; iv) receiving, from a second network-based server, a second message to install a second eSIM 208 to the wireless device 102 from a second provisioning server; v) attempting provisioning of the second eSIM 208 from the second provisioning server; vi) receiving a failure indication from the second provisioning server disallowing provisioning of the second eSIM 208 to the wireless device 102; vii) comparing network addresses of the first and second provisioning servers; and viii) when the network addresses of the first and second provisioning servers are identical, refraining from presenting a failure alert notification for failing to install the second eSIM 208. In some embodiments, the method further includes the wireless device 102: ix) presenting a consent notification for installation of the first eSIM 208 to a user of the wireless device 102 after receipt of the first message to install the first eSIM 208; and x) performing installation of the first eSIM 208 only after receiving consent from the user of the wireless device 102.

In some embodiments, a method for managing eSIM 208 installation by a wireless device 102 includes the wireless device 102: i) receiving, from a first network-based server, a first message to install a first eSIM 208 to the wireless device 102 from a first provisioning server; ii) initiating installation of the first eSIM 208 from the first provisioning server on an eUICC 108 of the wireless device 102; iii) receiving, from a second network-based server before completing installation of the first eSIM 208, a second message to install a second eSIM 208 to the wireless device 102 from a second provisioning server; iv) queuing information for installation of the second eSIM 208 after receipt of the second message to install the second eSIM 208; v) completing installation of the first eSIM 208 on the eUICC 108 of the wireless device 102; vi) storing a network address for the first provisioning server after successful installation of the first eSIM 208; vii) attempting, based on the queued information, provisioning of the second eSIM 208 from the second provisioning server; viii) receiving a failure message from the second provisioning server indicating the second eSIM 208 is unavailable for provisioning to the wireless device 102; ix) comparing network addresses of the first and second provisioning servers; and x) when the network addresses for the first and second provisioning servers are identical, refraining from presenting a failure alert notification for failing to install the second eSIM 208. In some embodiments, the first message includes a push notification message triggered by a lookup server, the push notification message including the network address of the first provisioning server and a unique identifier value for the first eSIM 208. In some embodiments, the method further includes the wireless device 102 requesting and obtaining, from a user of the wireless device 102, user consent for installation of the first eSIM 208 before initiating installation of the first eSIM 208.

In some embodiments, a method for managing eSIM 208 installation by a wireless device 102 includes the wireless device 102: i) receiving, from a first network-based server, a first message to install a first eSIM 208 to the wireless device 102 from a first provisioning server; ii) initiating installation of the first eSIM 208 from the first provisioning server on an eUICC 108 of the wireless device 102; iii) receiving, from a second network-based server before completing installation of the first eSIM 208, a second message to install a second eSIM 208 to the wireless device 102 from a second provisioning server; iv) after successful installation of the first eSIM 208 on the eUICC 108 of the wireless device 102, comparing network addresses of the first and second provisioning servers; and v) when a) the network addresses of the first and second provisioning servers do not match and b) the second message from the second network-based server includes a push notification triggered by a lookup server: requesting, from a user of the wireless device 102, consent for installation of the second eSIM 208 from the second provisioning server. In some embodiments, the method further includes the wireless device 102: vi) determining installation of the first eSIM 208 is ongoing after receipt of the second message to install the second eSIM 208; and vii) deferring creation of a user consent notification for installation of the second eSIM 208.

In some embodiments, a method for managing eSIM 208 installation by a wireless device 102 includes the wireless device 102: i) receiving, from a first network-based server, a first message to install a first eSIM 208 to the wireless device 102 from a first provisioning server; ii) initiating installation of the first eSIM 208 from the first provisioning server on an eUICC 108 of the wireless device 102; iii) receiving, from a second network-based server before completing installation of the first eSIM 208, a second message to install a second eSIM 208 to the wireless device 102 from a second provisioning server; iv) comparing network addresses of the first and second provisioning servers; and v) when the network addresses of the first and second provisioning servers do not match: a) queuing information for installation of the second eSIM 208; and b) after successful installation of the first eSIM 208, downloading the second eSIM 208 from the second provisioning server and installing the second eSIM 208 on the eUICC 108 of the wireless device 102. In some embodiments, the first message includes a push notification received from a push notification server and triggered by a lookup server, and the second message includes a mobile device management (MDM) command from an MDM server. In some embodiments, the lookup server is managed by an original equipment manufacturer (OEM) of the wireless device 102 or a third party affiliated therewith, and the MDM server is managed by a business enterprise with which the wireless device 102 is associated.

In some embodiments, a method for wireless device 102 setup and configuration using bootstrap connectivity includes the wireless device 102: i) establishing a cellular wireless data connection using credentials of a bootstrap eSIM 208 pre-installed in the wireless device 102; ii) obtaining, from an activation server via the cellular wireless data connection, a configuration file for the wireless device 102; iii) determining a network address for an MNO provisioning server 116 based at least in part on information from the configuration file; iv) downloading, from the MNO provisioning server 116 via the cellular wireless data connection, a fully functional eSIM 208; v) installing the fully functional eSIM 208 on an eUICC 108 of the wireless device 102; vi) disabling the bootstrap eSIM 208; vii) establishing a second cellular wireless data connection using credentials of the fully functional eSIM 208; viii) downloading, from an MDM server via the second cellular wireless data connection, an MDM profile for the wireless device 102; and ix) downloading, via the second cellular wireless data connection, and installing one or more applications and data files based on configuration information included in the MDM profile. In some embodiments, the bootstrap eSIM 208 is pre-installed in the wireless device 102 at a time of manufacture. In some embodiments, the fully functional eSIM 208 is pre-released by the MNO provisioning server 116 based on pre-enrollment of the wireless device 102 for MDM service. In some embodiments, the wireless device 102 performs the wireless device 102 setup and configuration using bootstrap connectivity in response to determining a lack of availability of a non-cellular wireless connection or a fully functional physical SIM or eSIM 208 cellular wireless connection for the wireless device 102. In some embodiments, the information from the configuration file includes the network address of the MNO provisioning server 116. In some embodiments, the information from the configuration file includes a network address of a device manufacturer device services server from which to obtain the network address of the MNO provisioning server 116.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or next generation (NG) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for setup and configuration of a wireless device using bootstrap connectivity, the method comprising:
　by the wireless device:
　　downloading, from a mobile network operator (MNO) provisioning server via a cellular wireless data connection established using a provisioning electronic subscriber identity module (eSIM) pre-installed in the wireless device, a fully functional eSIM;
　　installing the fully functional eSIM on an embedded universal integrated circuit card (eUICC) of the wireless device;
　　disabling the provisioning eSIM;
　　establishing a second cellular wireless data connection using credentials of the fully functional eSIM;
　　downloading, from a mobile device management (MDM) server via the second cellular wireless data connection, an MDM profile for the wireless device; and
　　installing one or more applications and data files based on configuration information included in the MDM profile.

2. The method of claim 1, wherein the provisioning eSIM is pre-installed in the wireless device at a time of manufacture.

3. The method of claim 1, wherein the fully functional eSIM is pre-released by the MNO based on pre-enrollment of the wireless device for MDM service.

4. The method of claim 1, wherein the wireless device performs setup and configuration of the wireless device using provisioning eSIM based connectivity in response to determining a lack of availability of a non-cellular wireless connection or a fully functional physical SIM or eSIM cellular wireless connection for the wireless device.

5. The method of claim 1, further comprising:
by the wireless device:
establishing the cellular wireless data connection using credentials of the provisioning eSIM pre-installed in the wireless device;
obtaining, from an activation server via the cellular wireless data connection, a configuration file for the wireless device; and
determining a network address for the MNO provisioning server based at least in part on information from the configuration file.

6. The method of claim 5, wherein the information from the configuration file comprises the network address of the MNO provisioning server.

7. The method of claim 5, wherein the information from the configuration file comprises a network address of a device manufacturer device services server from which to obtain the network address of the MNO provisioning server.

8. An apparatus for setup and configuration of a wireless device using bootstrap connectivity, the apparatus comprising a processor communicatively coupled to a memory storing instructions that configure the wireless device to:
download, from a mobile network operator (MNO) provisioning server via a cellular wireless data connection established using a provisioning electronic subscriber identity module (eSIM) pre-installed in the wireless device, a fully functional eSIM;
install the fully functional eSIM on an embedded universal integrated circuit card (eUICC) of the wireless device;
disable the provisioning eSIM;
establish a second cellular wireless data connection using credentials of the fully functional eSIM;
download, from a mobile device management (MDM) server via the second cellular wireless data connection, an MDM profile for the wireless device; and
install one or more applications and data files based on configuration information included in the MDM profile.

9. The apparatus of claim 8, wherein the provisioning eSIM is pre-installed in the wireless device at a time of manufacture.

10. The apparatus of claim 8, wherein the fully functional eSIM is pre-released by the MNO based on pre-enrollment of the wireless device for MDM service.

11. The apparatus of claim 8, wherein the wireless device performs setup and configuration of the wireless device using provisioning eSIM based connectivity in response to determining a lack of availability of a non-cellular wireless connection or a fully functional physical SIM or eSIM cellular wireless connection for the wireless device.

12. The apparatus of claim 8, wherein the wireless device is further configured to:
establish the cellular wireless data connection using credentials of the provisioning eSIM pre-installed in the wireless device;
obtain, from an activation server via the cellular wireless data connection, a configuration file for the wireless device; and
determine a network address for the MNO provisioning server based at least in part on information from the configuration file.

13. The apparatus of claim 12, wherein the information from the configuration file comprises the network address of the MNO provisioning server.

14. The apparatus of claim 12, wherein the information from the configuration file comprises a network address of a device manufacturer device services server from which to obtain the network address of the MNO provisioning server.

15. A non-transitory computer-readable medium storing instructions for setup and configuration of a wireless device using bootstrap connectivity, the instructions comprising:
instructions for downloading, from a mobile network operator (MNO) provisioning server via a cellular wireless data connection established using a provisioning electronic subscriber identity module (eSIM) pre-installed in the wireless device, a fully functional eSIM;
instructions for installing the fully functional eSIM on an embedded universal integrated circuit card (eUICC) of the wireless device;
instructions for disabling the provisioning eSIM;
instructions for establishing a second cellular wireless data connection using credentials of the fully functional eSIM;
instructions for downloading, from a mobile device management (MDM) server via the second cellular wireless data connection, an MDM profile for the wireless device; and
instructions for installing one or more applications and data files based on configuration information included in the MDM profile.

16. The non-transitory computer-readable medium of claim 15, wherein the provisioning eSIM is pre-installed in the wireless device at a time of manufacture.

17. The non-transitory computer-readable medium of claim 15, wherein the fully functional eSIM is pre-released by the MNO based on pre-enrollment of the wireless device for MDM service.

18. The non-transitory computer-readable medium of claim 15, wherein the wireless device performs setup and configuration of the wireless device using provisioning eSIM based connectivity in response to determining a lack of availability of a non-cellular wireless connection or a fully functional physical SIM or eSIM cellular wireless connection for the wireless device.

19. The non-transitory computer-readable medium of claim 15, wherein the instructions further comprise:
instructions for establishing the cellular wireless data connection using credentials of the provisioning eSIM pre-installed in the wireless device;
instructions for obtaining, from an activation server via the cellular wireless data connection, a configuration file for the wireless device; and
instructions for determining a network address for the MNO provisioning server based at least in part on information from the configuration file.

20. The non-transitory computer-readable medium of claim 19, wherein the information from the configuration file comprises:
the network address of the MNO provisioning server, or a network address of a device manufacturer device services server from which to obtain the network address of the MNO provisioning server.

\* \* \* \* \*

UNITED STATES PATENT AND TRADEMARK OFFICE
CERTIFICATE OF CORRECTION

PATENT NO. : 12,167,498 B2
APPLICATION NO. : 18/476674
DATED : December 10, 2024
INVENTOR(S) : Can Xiong et al.

Page 1 of 1

It is certified that error appears in the above-identified patent and that said Letters Patent is hereby corrected as shown below:

In the Specification

At Column 7, Line 15: "IT administrator 302 to install an eSIM 208 non the wireless" should read
-- IT administrator 302 to install an eSIM 208 on the wireless --.

At Column 17, Line 9: "example of FIG. a wireless device 102 receives a push" should read
-- example of FIG. 10A, a wireless device 102 receives a push --.

At Column 24, Line 30: "the second message includes an push notification that" should read -- the second message includes a push notification that --.

At Column 25, Line 22: "eUICC 108 of the wireless device 102. It 1606, the wireless" should read
-- eUICC 108 of the wireless device 102. At 1606, the wireless --.

Signed and Sealed this
Ninth Day of December, 2025

John A. Squires
*Director of the United States Patent and Trademark Office*